United States Patent
Chun et al.

[11] Patent Number: 5,917,949
[45] Date of Patent: Jun. 29, 1999

[54] COMPACTION/MOTION ESTIMATION APPARATUS USING A GRID MOVING METHOD FOR MINIMIZING IMAGE INFORMATION OF AN OBJECT

[75] Inventors: Sung-Moon Chun, Seoul; Gwang-Hoon Park, Inchon; Joo-Hee Moon, Seoul; Kuk-Yeol Yoo, Daejeon; Jae-Kyoon Kim, Seoul, all of Rep. of Korea

[73] Assignee: Hyundai Electronics Industries Co., Ltd., Kyoungkido, Rep. of Korea

[21] Appl. No.: 08/679,758

[22] Filed: Jul. 10, 1996

[30] Foreign Application Priority Data

Jul. 10, 1995 [KR] Rep. of Korea ............... 95-20198
Jul. 10, 1995 [KR] Rep. of Korea ............... 95-20199
Oct. 26, 1995 [KR] Rep. of Korea ............... 95-37919
Mar. 12, 1996 [KR] Rep. of Korea ............... 96-6465

[51] Int. Cl.$^6$ .................................................. G06K 9/36
[52] U.S. Cl. ................. 382/236; 382/243; 382/107; 348/384
[58] Field of Search ............................. 382/263, 294, 382/107, 236, 278; 348/384, 620, 416, 99, 202; 250/556; 378/146, 155

[56] References Cited

U.S. PATENT DOCUMENTS

| | | | |
|---|---|---|---|
| 5,351,083 | 9/1994 | Tsukagoshi ..................... | 348/384 |
| 5,557,684 | 9/1996 | Wang et al. ...................... | 382/107 |
| 5,611,000 | 3/1997 | Szeliski et al. .................. | 382/294 |

FOREIGN PATENT DOCUMENTS

| | | | |
|---|---|---|---|
| 0 632 662 A1 | 1/1995 | European Pat. Off. ......... | H04N 7/32 |
| 0 639 925 A2 | 2/1995 | European Pat. Off. ......... | H04N 7/32 |

OTHER PUBLICATIONS

Peter Gerken, "Object–Based Analysis–Synthesis Coding of Image Sequences at Very Low Bit Rates", IEEE Transactions on Circuits and Systems for Video Technology, vol. 4, No. 3, Jun. 1994, pp. 228–235.

Hans G. Musmann, "Object–Based Analysis–Synthesis Coding", Tutorial 3: Advanced Algorithms and Implementations for Coding of Moving Images, Chapter 3.31, pp. 173–179. (Unknown Date).

Michael Hotter and Robert Thoma, Image Segmentation Based on Object Oriented Mapping Parameter Estimation, Elsevier Science Publishers B.V, Signal processing, 1988, pp. 315–334.

MPEG–4 Proposal Package Description (PPD)—Revsion 3 (Tokyo Revision), ISO/IEC JTC1/SC29/WG11 N998, MPEG 95, Jul. 1995, Source: AOE Sub Group.

"Low–Complexity Shape Adaptive DCT (SA–DCT) for Coding of Region Texture", Core Experiment 04: [HHI/Hyundae] (Unknown Date).

*Primary Examiner*—Jose L. Couso
*Assistant Examiner*—Anh Hong Do
*Attorney, Agent, or Firm*—Jacobson, Price, Holman & Stern, PLLC

[57] ABSTRACT

An improved grid moving method of an object image and an apparatus using the same which are capable of reducing the amount of information with respect to the image of an object by moving the grid in accordance with a position in which an image of the object having shape information exists, which include the steps of: a moving step for forming a grid over an image of an object having shape information, segmenting the image into a plurality of unit regions, and moving the formed grid; a judging step for judging an amount of the information at each position to which the grid is moved in the moving step; a detecting step for detecting a position at which the amount of the information is reduced; a compaction step for reforming the grid in accordance with the position detected in the detecting step and for coding the image of the object existing in unit regions of the reformed grid; and a motion estimation step for reforming the grid in accordance with the position detected in the detecting step and for estimating the motion of the image of the object in the unit regions in which the image of the object exists among the unit regions segmented by the reformed grid.

30 Claims, 21 Drawing Sheets

Fig 9
Fig 9A
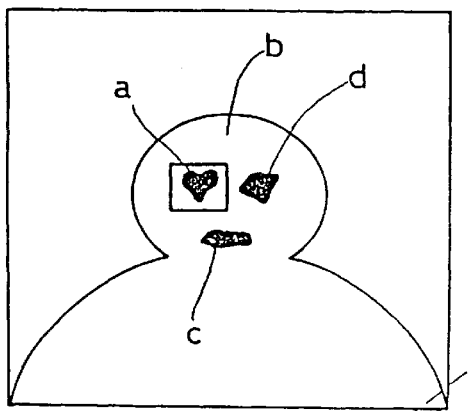
Fig 9B
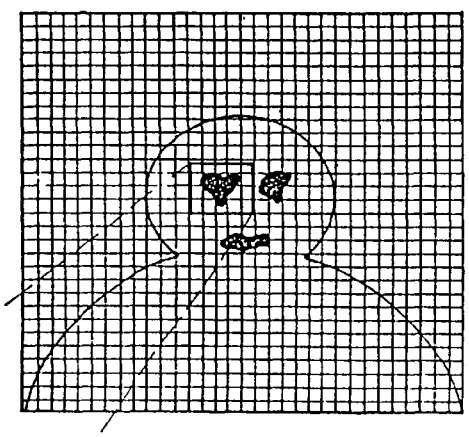
Fig 9C
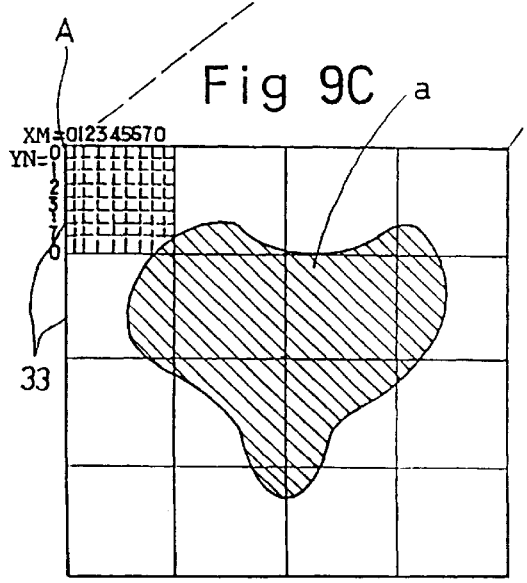
Fig 9D
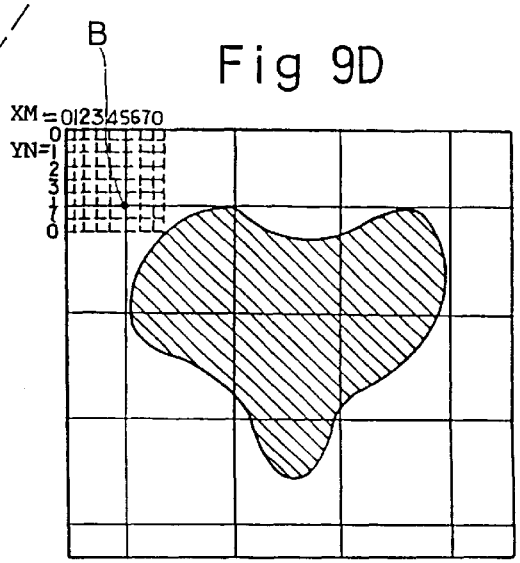

Fig 9
Fig 9E
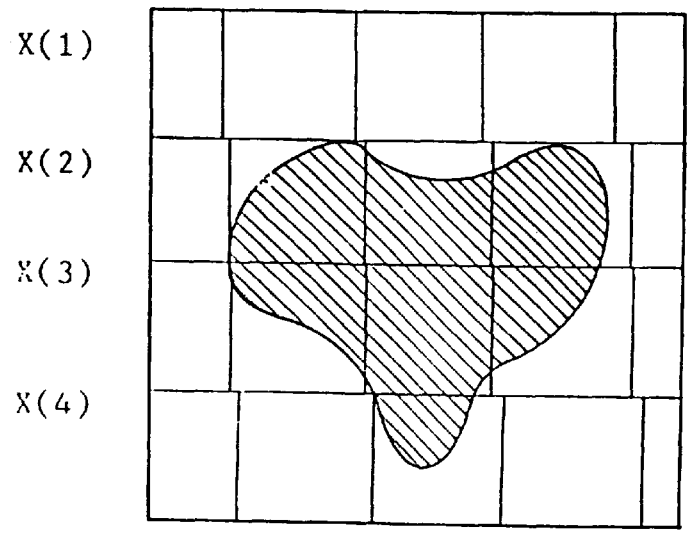
Fig 9F
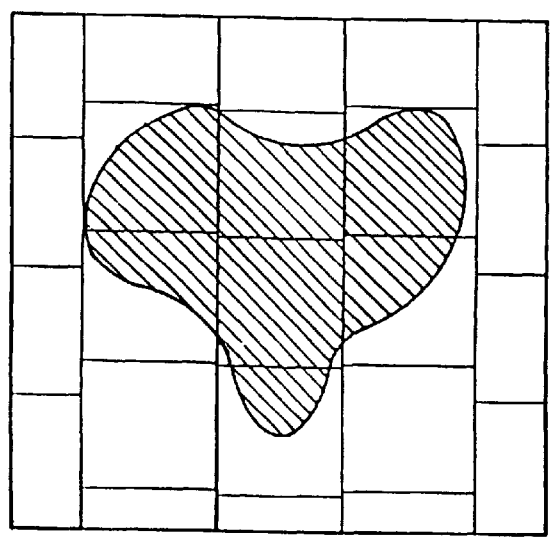

Fig 12
Fig 12A
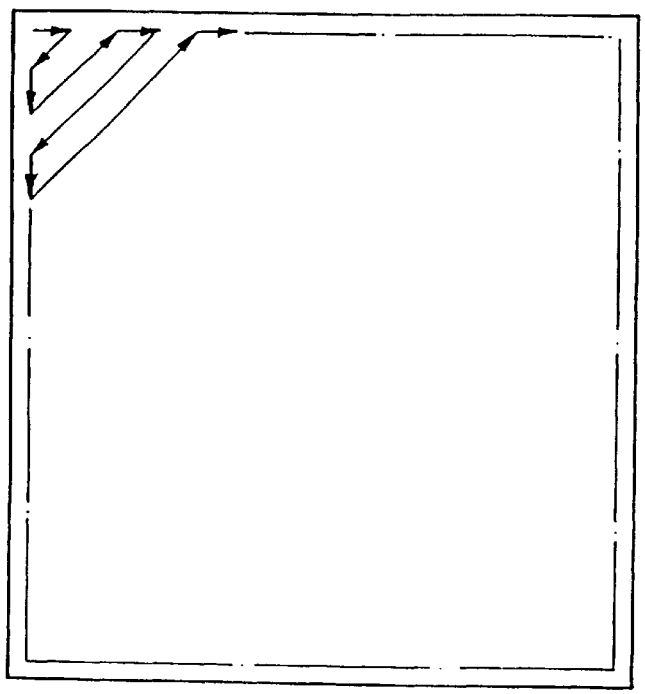
Fig 12B
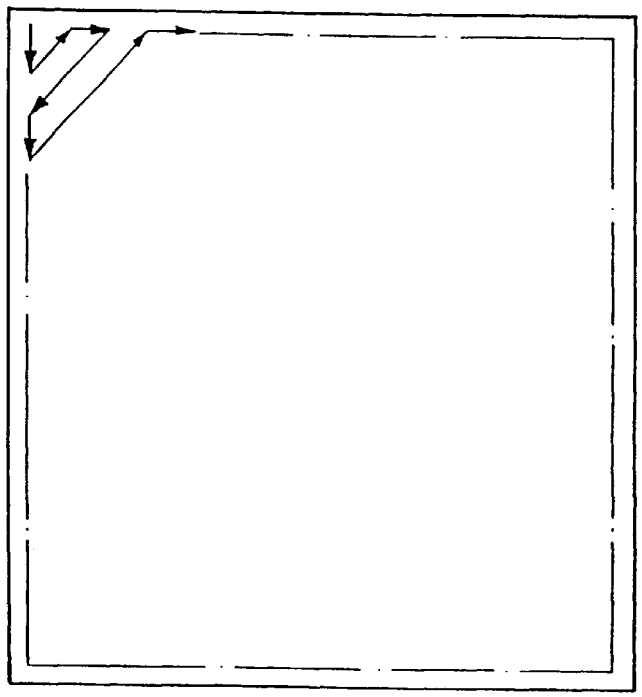

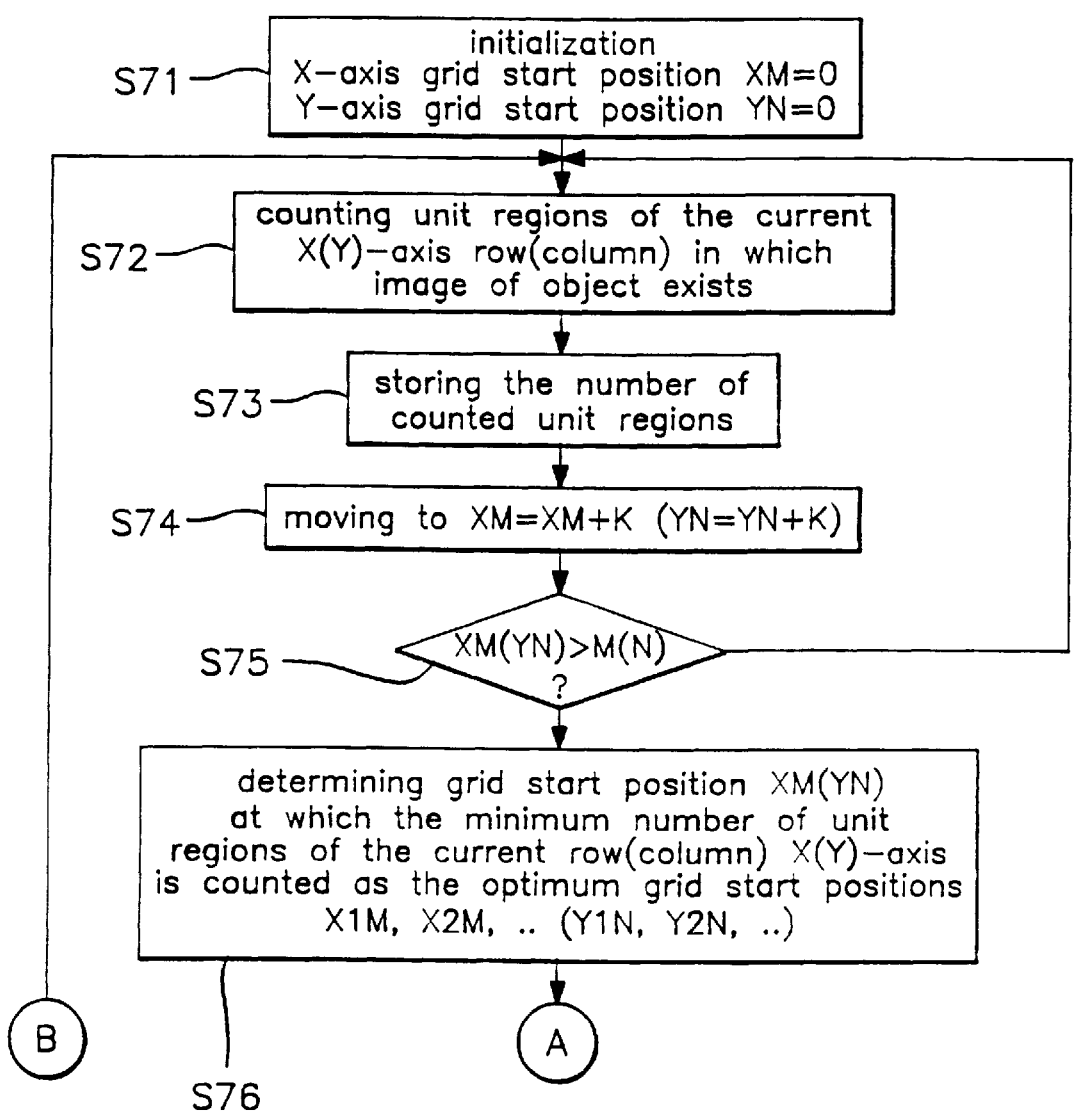

Fig 15

|  | PSNR(dB) | number of bits | number of pixels | BPP | number of blocks |
|---|---|---|---|---|---|
| SADCT | 36.46 | 751 | 622 | 1.21 | 20.71 |
| FBG-SADCT | 36.37 | 719 | 622 | 1.16 | 18.65 |
| VBG-SADCT 1-X method | 36.30 | 713 | 622 | 1.15 | 17.80 |
| VBG-SADCT 1-Y method | 36.34 | 721 | 622 | 1.16 | 17.80 |
| VBG-SADCT 2-X method | 36.29 | 702 | 622 | 1.13 | 17.27 |
| VBG-SADCT 2-Y method | 36.36 | 708 | 622 | 1.14 | 17.45 |
| VBG-SADCT 2-X method (by object) | 36.30 | 694 | 622 | 1.12 | 16.82 |
| amount reduced |  | about 60 bits |  | about 0.1 BPP | about 4 blocks |

Fig 16

|  | PSNR(dB) | number of bits | number of pixels | BPP | number of blocks |
|---|---|---|---|---|---|
| SADCT | 36.23 | 1093 | 648 | 1.68 | 24.60 |
| FBG-SADCT | 36.21 | 1044 | 648 | 1.61 | 21.62 |
| VBG-SADCT 1-X method | 36.21 | 1031 | 648 | 1.59 | 20.53 |
| VBG-SADCT 1-Y method | 36.15 | 1029 | 648 | 1.59 | 20.53 |
| VBG-SADCT 2-X method | 36.18 | 1023 | 648 | 1.58 | 20.11 |
| VBG-SADCT 2-Y method | 36.11 | 1022 | 648 | 1.58 | 20.18 |
| VBG-SADCT 2-X method (by object) | 36.11 | 1018 | 648 | 1.57 | 19.47 |
| amount reduced |  | about 60 bits |  | about 0.1 BPP | about 5 blocks |

Fig 17
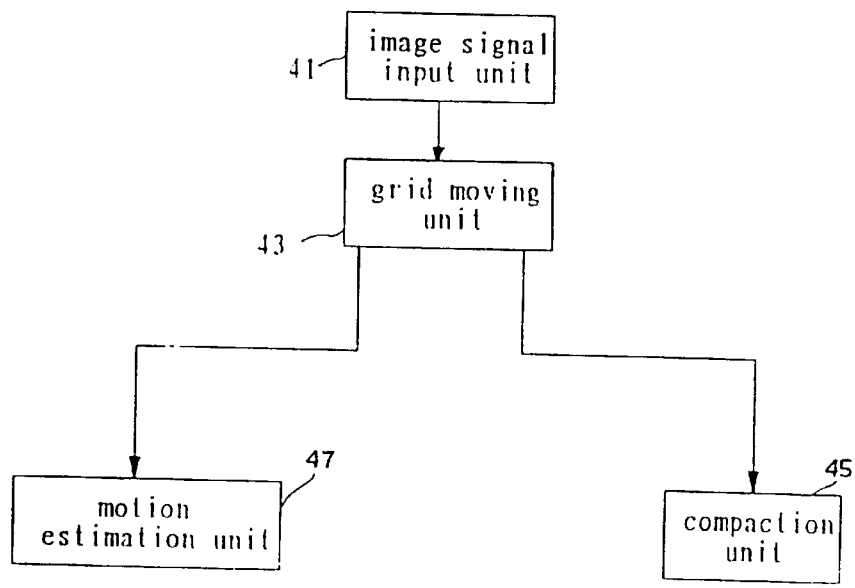
Fig 18
Fig 18A
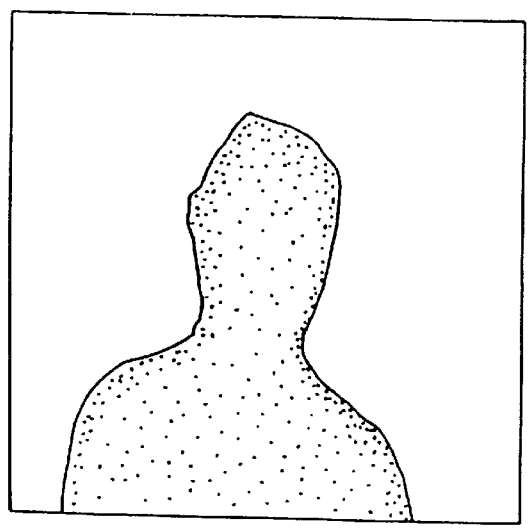

Fig 18
Fig 18B
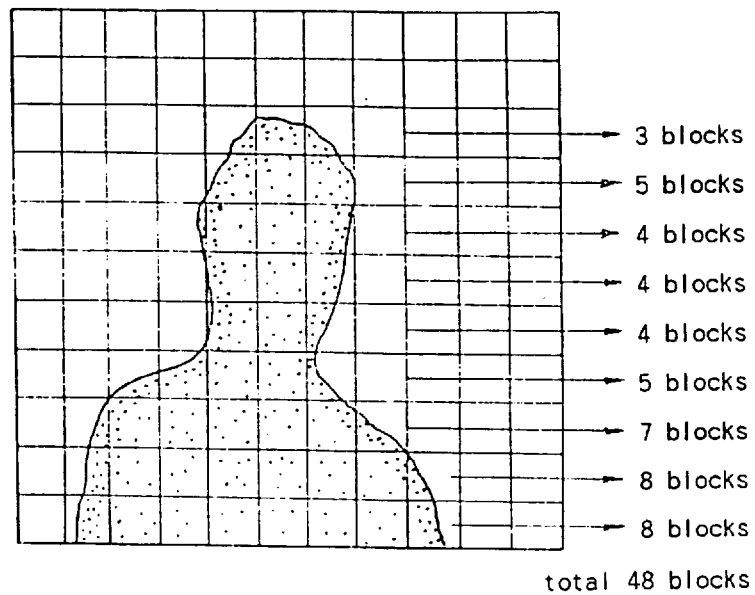
Fig 18C
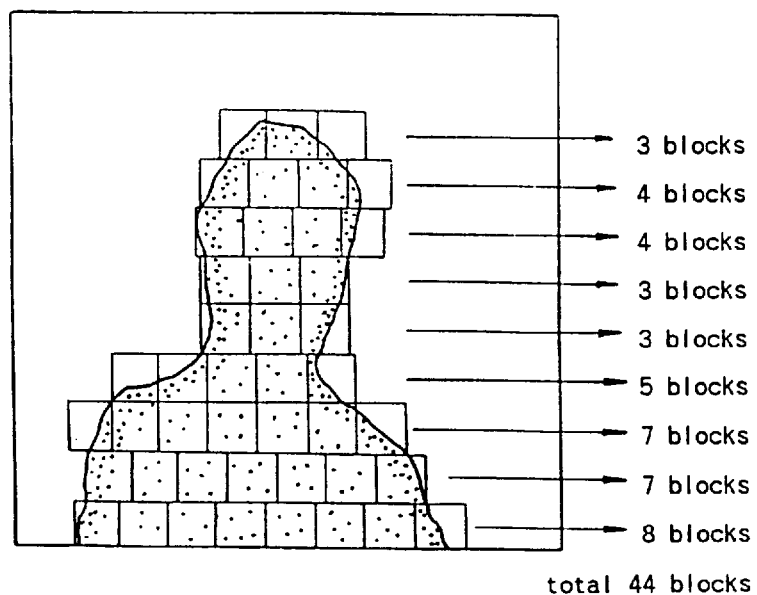

COMPACTION/MOTION ESTIMATION APPARATUS USING A GRID MOVING METHOD FOR MINIMIZING IMAGE INFORMATION OF AN OBJECT

BACKGROUND OF THE INVENTION

1. Field of the Invention

The present invention relates to a grid moving method for minimizing image information of an object image and an apparatus therefor, and a compaction/motion estimation method using the grid moving method and an apparatus therefor, and particularly to an improved grid moving method for an object image and an apparatus therefor and a compaction/motion estimation method using the grid moving method and an apparatus therefor, which are capable of forming a grid with respect to an image of a predetermined object having shape information and, in a region of an image, dividing the region of the image into a plurality of unit regions, moving the formed grid and detecting a position at which the amount of information is reduced when performing a compaction or estimating a motion of an object. In addition, the present invention is basically directed to reforming the grid to a position at which the amount of information is reduced by moving the grid, and is directed to separating and coding each unit region in which an image of the object exist from the reformed grid and using the grid movement of the image of an object of which the motion is estimated.

2. Description of the Related Art

Conventionally, since an image of an object having a predetermined shape contains a great amount of image data, when storing the image data in a recording/writing medium, a large space is necessary for storing the data. In addition, transmitting the data takes too much time, so it is difficult to transmit the data in real time.

Therefore, the image of the object is coded, and the motion of the image is estimated and then the amount of the information in the image is reduced for storing the information in a predetermined recording/writing medium. Thereafter, the information is transmitted to a predetermined destination in real time.

When coding an image of an object, a vector quantumization method or a discrete cosine transform (DCT) method is used.

Recently, a shape adaptive discrete cosine transform (SADCT) method has been effectively used in industry. This method is very effective for object-based compaction.

The above-mentioned shape adaptive discrete cosine transform method is directed to forming a grid with respect to an image frame, dividing an image of an object into a plurality of unit regions each having predetermined size and shape information, separating a unit region from the plurality of the unit regions in which an image of the object exists and then coding the unit region.

In addition, when the unit region contains an image to be coded, the effectiveness between a two-dimensional region DCT and a compaction become identical in the shape adaptive discrete cosine transform. When the unit region does not contain the image to be coded, the pixel, in which an image of an object exists, is processed with respect to the X-axis in a one-dimensional discrete cosine transform method, and a result of the above X-axis-based process is processed with respect to the Y-axis in a one-dimensional discrete cosine transform method. Thereafter, the final result value is obtained.

The shape adaptive discrete cosine transform method is further directed to reducing the number of unit regions in which an image of an object exists and performing the compaction after substantially filling the image of the object in the unit region, thus enhancing the compaction of a transform constant.

Therefore, when performing the shape adaptive discrete cosine transform process, the image of the object to be coded should preferably be substantially filled in each unit region, and then the number of unit regions in which an image of the object exists is effectively reduced.

The above-described shape adaptive discrete cosine transform process will now be described in more detail with reference to FIGS. 1A through 3F.

FIGS. 1A and 1B show grid patterns formed in one frame.

As shown therein, one frame is divided into a plurality of rows and columns which are consisted of a plurality of unit regions 21 having the same size and shape in cooperation with a P×Q number of X-axis grid and Y-axis grid 11 and 13 spaced apart from one another at a regular distance.

A unit region 21 may be formed in various shapes.

For example, the unit region 21 is formed in a regular square or a rectangular form by the X-axis and Y-axis grid 11 and 13. In addition, as shown in FIG. 2A. A unit region 21 may be formed as a horizontally lying triangle or a horizontally upside down triangle, and neighboring triangles form rectangular shapes bounded by the slant grids 15 and 17. As shown in FIG. 2B, a unit region 21 is formed by vertically lying triangles and neighboring triangles form rectangular shapes bounded by the slant grids 15 and 17.

In addition, as shown in FIG. 2C, the unit region 21 is formed as a 45° rotated square by the slant grids 15 and 17, and as shown in FIGS. 2D and 2E, the unit region 21 is formed in a hexagonal shape by the slant grids 15 and 17. As shown in FIG. 2F, the unit region 21 is formed in an octagonal form having a 45° rotated small square between the neighboring octagons. In this example, two different shaped unit regions 21 and concurrently used.

Any shape which spatially and evenly divides the image frame may be used for the unit region 21.

A square- or rectangular-shaped unit region 21 which is defined by an X-axis grid 11 and Y-axis grid 13 will now be explained.

As shown in FIG. 1B, the unit region 21 is formed of an M×N number of unit pixels 23 in the X-axis and Y-axis directions. For example, one unit region 21 is formed of an 8×8 number of unit pixels 23 or is formed of a 16×16 number of unit pixels 23.

In addition, a unit region 21 is defined as an M×N number of blocks in accordance with the number of unit pixels 23. As shown in FIG. 1B, the unit region 21 refers to an 8×8 number of blocks corresponding to unit pixels.

FIG. 3A shows an image (shown as the hatched portion) having predetermined shape information in a unit region 21 formed of an 8×8 number of unit pixels 23.

For the shape adaptive discrete cosine transform with respect to the image of an object, as shown in FIG. 3B, the image of the object is filled from the upper side margin portion of the unit region 21, and then the one-dimensional cosine transform is performed with respect to the Y-axis which is shown in the vertical direction.

The one-dimensional discrete cosine transform is performed as shown in FIG. 3D.

When the one-dimensional discrete cosine transform is completed with respect to the Y-axis, the image of the object is filled from the left side margin portion of the unit region 21, as shown in FIG. 3E, and then the one-dimensional discrete cosine transform is performed with respect to the X-axis which is shown in the horizontal direction.

When the one-dimensional discrete cosine transform is completed with respect to the X-axis, as shown in FIG. 3F, the shape adaptive discrete cosine transform with respect to the Y-axis and X-axis is completed.

Thereafter, a zig-zag scan is performed with respect to the final shape, as shown in FIG. 3F, which is obtained by the above-mentioned shape adaptive discrete cosine transform. For example, the zig-zag scan is performed diagonally from the leftmost side and the uppermost side to the rightmost side and the lowermost side.

However, the conventional shape adaptive discrete cosine transform is directed to performing the shape adaptive discrete cosine transform in accordance with the position in which the image of an object exists without moving the position of the grid.

Therefore, the bit rate per frame is high, and since the number of the unit regions in which the image of the object exists is numerous, there is a restriction on the ability to reduce an amount of compaction information which is obtained by coding the image of the object and the amount of motion information which is obtained by estimating the motion of the object.

In addition, when coding an object in the conventional discrete cosine transform method or the vector quantumization, since the compaction is performed without moving the position of the grid in accordance with the position in which the image of the object exists, the hit rate per frame is high as in the shape adaptive discrete cosine transform, and since the number of unit regions in which the image of the object exists is numerous, there is a restriction on the ability to reduce the amount of compaction information and the amount of motion information.

Meanwhile, when coding the image of a moving object among the images of an object having predetermined shape information, an object-based moving image coding method is generally used in the industry.

The above-mentioned object-based moving image coding method is directed to segmenting the image of the object in a background in which there is not a moving image and a changed region which is defined by the moving image of the object.

In addition, the moving object of the changed region is segmented into a motion compensable object and a motion compensable failed object through motion estimation.

Here, the motion compensable object refers to the moving object having a predetermined theory such as a horizontal movement, a rotational movement, a lineal movement, and the like in a state that the object in a three-dimensional space is converted into a two-dimensional image of the object. In addition, the motion compensable failed object refers to an object which is not adaptable with respect to the above-mentioned theory.

When transmitting and storing the image of the object, the motion compensable object process is directed to detecting motion information of the image of the object.

In addition, the image of the motion compensable failed object and the image of the exposed object are most effectively coded so as to reduce the amount of information, which is then transmitted and stored.

Since the amount of information with respect to the image of the motion compensable failed object is about 60–70% of the total amount of the information to be transmitted, many studies have been conducted, in the industry, so as to reduce the amount of information transmitted.

The motion estimation of the motion compensable object is directed to segmenting and estimating the moving portion of the moving image from a picture of the previous frame so as to minimize the amount of motion information.

However, since the variables with respect to the moving object are various, it is difficult to effectively extract, transmit, and store motion information in response to the immediate movement of the object.

Therefore, in the industry, it is urgently needed to transmit and store picture information of a high resolution having a small amount of information with respect to the motion compensable object in the motion estimation method.

SUMMARY OF THE INVENTION

Accordingly, it is an object of the present invention to provide a grid moving method for minimizing image information of an object image and an apparatus using the grid moving method and a compaction/motion estimation method using the grid moving method and an apparatus therefor which overcomes the problems encountered in the conventional method of an object image and an apparatus therefor and a conventional compaction/motion estimation method and an apparatus therefor.

It is another object of the present invention to provide a grid moving method for an object image and an apparatus using the grid moving method which are capable of reducing amount of information with respect to the image of an object by moving the grid in accordance with a position in which an image of the object having predetermined shape information exists.

It is another object of the present invention to provide a grid moving method for an object image and an apparatus using the grid moving method which are capable of reducing the number of unit regions in which an image of the object exists by moving the grid so as to reduce the amount of the information with respect to the image of the object.

It is another object of the present invention to provide an image signal coding apparatus and a compaction method using a grid moving method which are capable of reducing the amount of compaction information by compacting the unit regions in which the image of the object exists among the unit regions segmented by the grid moved in accordance with the position in which the image of the object exists.

It is another object of the present invention to provide an image signal coding apparatus and a compaction method using a grid moving method which are capable of reducing the amount of information by compacting the unit region in which the image of a motion compensable failed object having predetermined shape information exists among the unit regions which is segmented by the grid moved in accordance with the position in which the image of the motion compensable failed object exists.

It is another object of the present invention to provide a motion estimation apparatus and a method of the motion estimation apparatus using a grid moving method which is capable of estimating the motion information as a unit region in which an image of the motion compensable object exists among the unit region which is segmented by the grid which is moved in accordance with the position in which an image of the motion compensable object exists.

To achieve the above objects, the present invention is basically directed to segmenting an image of an object having predetermined shape information with a grid, detecting a position in which the amount of this information can be reduced by moving the position of the grid along the X-axis or Y-axis directions, and moving the grid to the position in which the amount of information can be reduced.

To achieve the above objects, the present invention is directed to moving the position of the grid so that the image of the object can be positioned in the minimum number of unit regions so as to reduce the amount of information with respect to the image of the object.

To achieve the above objects, the present invention is directed to detecting the number of unit regions in which the image of an object exists and moving the position of the grid so that the image of the object exists in the minimum number of unit regions and coding the image of the object existing in the detected unit regions so as to minimize the amount of information.

To achieve the above objects, the present invention is directed to judging the unit regions in which the image of the object exists in a state that the position of the grid is moved so that the image of the object can exists in the minimum number of unit regions, and estimating the motion of the object using the judged unit region and detecting the position of the grid using the information of the object.

To achieve the objects above, there is provided a grid moving method of an object image, including the steps of: a segmenting step for forming a grid over an image of an object having predetermined shape information and for segmenting the image into a plurality of unit regions; and a detecting step for detecting a position at which the amount of information is reduced by moving the grid formed in the segmenting step.

To achieve the objects above, there is provided a compaction/motion estimation method, including the steps of: a moving step for forming a grid over an image of an object having predetermined shape information, segmenting the image into a plurality of unit regions, and moving the formed grid; a judging step for judging the amount of information at each position to which the grid is moved in the moving step; a detecting step for detecting a position at which the amount of information is reduced; a compaction step for reforming the grid in accordance with the position detected in the detecting step and for coding the image of the object existing in each unit region of the reformed grid; and a motion estimation step for reforming the grid in accordance with the position detected in the detecting step and for estimating the motion of the image of the object in the unit regions in which the image of the object exists among the unit regions segmented by the reformed grid.

To achieve the objects above, there is provided a compaction method, including the steps of: a moving step for forming a grid over an image of an object having predetermined shape information, segmenting the image into a plurality of unit regions, and for moving the formed grid; a judging step for judging the amount of information at each position to which the grid is moved in the moving step; a detecting step for detecting a position at which the amount of information is reduced in the judging step; and a compaction step for reforming the grid in accordance with the position detected in the detecting step and coding the image of the object existing in the unit region of the reformed grid.

To achieve the objects above, there is provided a motion estimation method, including the steps of: a moving step for forming a grid over an image of an object having predetermined shape information, segmenting the image into a plurality of unit regions, and moving the formed grid; a judging step for judging the amount of information at each position to which the grid is moved in the moving step; a detecting step for detecting a position at which the amount of information is reduced in the judging step; and a motion estimation step for reforming the grid in accordance with the position detected in the detecting step and for estimating the motion of the image of the object in the unit regions in which the image of the object exist among the unit regions by the reformed grid.

To achieve the objects above, there is provided a compaction/motion estimation method, including the steps of: a separating step for estimating the motion of an image of an object having predetermined shape information and for separating a motion compensable failed object image and a motion compensable object image: a first moving step for forming a grid over the motion compensable failed object image separated in the separating step, segmenting the image into a plurality of unit regions, and moving the grid; a first judging step for judging the amount of information at each position to which the grid is moved in the first moving step; a first detecting step for detecting a position at which the amount of information is reduced in the first judging step; a compaction step for reforming the grid in accordance with the position detected in the first detecting step and for coding the unit regions in which the image of the motion compensable failed object exists from among the unit regions which is segmented by the reformed grid; a second moving step for forming a grid over the image of the motion compensable object separated in the separating step, segmenting the image into a plurality of unit regions, and moving the grid; a second judging step for judging an amount of information at each position to which the grid is moved in the second moving step; a second detecting step for detecting a position at which the amount of information is reduced in the second judging step; and a motion estimating step for reforming the grid in accordance with the position detected in the second detecting step and for estimating the motion of the image of the motion compensable object using the unit regions in which the image of the motion compensable object exists from among the unit regions segmented by the reformed grid.

To achieve the objects above, there is provided a compaction method using a grid moving method for an object image, including the steps of: a separating step for estimating the motion of the image of an object having shape information and for separating the image of a motion compensable failed object; a moving step for forming a grid over the image of the motion compensable failed object separated in the separating step, segmenting the image into a plurality of unit regions, and moving the grid; a judging step for judging an amount of information at each position to which the grid is moved in the moving step; a detecting step for detecting a position at which the amount of information is reduced in the judging step; and a compaction step for reforming the grid in accordance with the position detected in the etecting step and for coding the unit regions in which the image of the motion compensable failed object exists among the unit regions segmented by the reformed grid.

To achieve the objects above, there is provided a motion estimation method using a grid movement of an image of an object, including the steps of: a separating step for estimating the motion of the image of the object having shape information and for separating the image of the motion compensable object; a moving step for forming a grid over the image of the motion compensable object separated in the separating step, segmenting the image into a plurality of unit regions, and moving the grid; a judging step for judging an amount of information at the position to which the grid is moved in the moving step; a detecting step for detecting a position at which the amount of information is reduced in the judging step; and a motion estimating step for reforming a grid in accordance with the position detected in the detecting step and for estimating the motion of the image of the motion compensable object using the unit regions in which the image of the motion compensable object exists from among the unit regions segmented by the reformed grid.

To achieve the objects above, there is provided a grid moving apparatus for an object image, including: an address generation controller for moving an address start position at which an address is generated by a predetermined distance within a predetermined region of a unit region; an address generator for separating the image of the object into unit regions in accordance with the address start position which the address generation controller outputs and for generating the address; a memory unit for storing the image of the object having inputted shape information and for outputting the image in accordance with an address outputted from the address generator; a region number counter for counting the number of unit regions in which the shape information of the object exists outputted from the memory unit; and minimum unit region grid selector for selecting an X-axis grid start position XM and a Y-axis grid start position YN at which the minimum number of unit regions is counted from among the number of the unit regions counted by the region number counter.

To achieve the objects above, there is provided a motion estimation apparatus using a grid moving of an object image, including: a grid moving unit for adjusting the grid in accordance with an image position of an object having shape information outputted from an image signal input unit and for reducing the number of unit regions in which the image of the object exists; and a motion estimation unit for estimating a motion of the image of object using the motion of the unit regions of which the number of unit regions is reduced.

To achieve the objects above, there is provided a compaction/motion estimation apparatus using a grid moving of an object image, including: an image separator for separating an image of a motion compensable failed object and an image of a motion compensable object in accordance with a motion from an image of an object having shape information; a first grid moving unit for adjusting the grid in accordance with an image position of the motion compensable failed object separated by the image separating unit and for reducing the number of unit regions in which the image of the motion compensable failed object exists; a compaction unit for coding the image of the object existing in the unit regions of which the number of the unit regions is reduced by the first grid moving means; a second grid moving unit for adjusting the grid in accordance with the image position of the motion compensable object separated by the image separating unit and for reducing the number of unit regions in which the image of the motion compensable object exists; and a motion estimation unit for estimating the motion information of the motion compensable object using the unit regions in which the image of the motion compensable object exists of which the number of the unit regions is reduced.

To achieve the objects above, there is provided a motion estimation apparatus using a grid moving of an object image, including: an image separating unit for separating an image of a motion compensable object in accordance with a motion of an object having shape information; a grid moving unit for adjusting a grid in accordance with an image position of the motion compensable object separated by the image separating unit and for reducing the number of unit regions in which the image of the motion compensable object exists; and a motion estimation unit for estimating motion information of the motion compensable object using the unit region in which the image of the motion compensable object exists of which the number of the unit regions is reduced by the grid moving unit.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 1A and 1B are views showing a conventional grid pattern formed in one image frame, of which:

FIG. 1A is a view showing a conventional grid pattern formed in one image frame; and FIG. 1B is a view showing a conventional unit region which is indicated as 8×8 pixels;

FIGS. 9A through 9F are views showing a method for extracting an image of an object in a grid moving method and detecting a position at which the amount of information existing in a unit region is a minimum number according to the present invention;

FIGS. 12A and 12B are views showing a method for sequentially outputting an image of a unit region by moving an X-axis and Y-axis grid start positions in a zig-zag manner in accordance with a signal flow of FIG. 11 according to the third embodiment of the present invention;

FIGS. 15 and 16 show tables showing a comparative result value of the conventional method and of the methods of the various embodiments according to the present invention, of which:

FIG. 15 is a table showing a comparative result value after moving a grid start potion in accordance with an image position of a young woman; and FIG. 16 is a table showing a comparative result value after moving a grid in accordance with an image position of an old woman;

FIG. 17 is a block diagram showing a motion estimation/compaction apparatus according to the first embodiment of the present invention;

FIGS. 18A through 18C are views showing an image which is reformed by detecting a position at which the amount of information is reduced from an image of a moving compensable object in a motion estimation method according to the present invention;

DETAILED DESCRIPTION OF THE INVENTION

A grid moving method for minimizing image information of an object and an apparatus using the grid moving method and a compaction/motion estimation method using the grid moving method and an apparatus therefor will now be described with reference to FIGS. 4 through 20.

Figure 4:
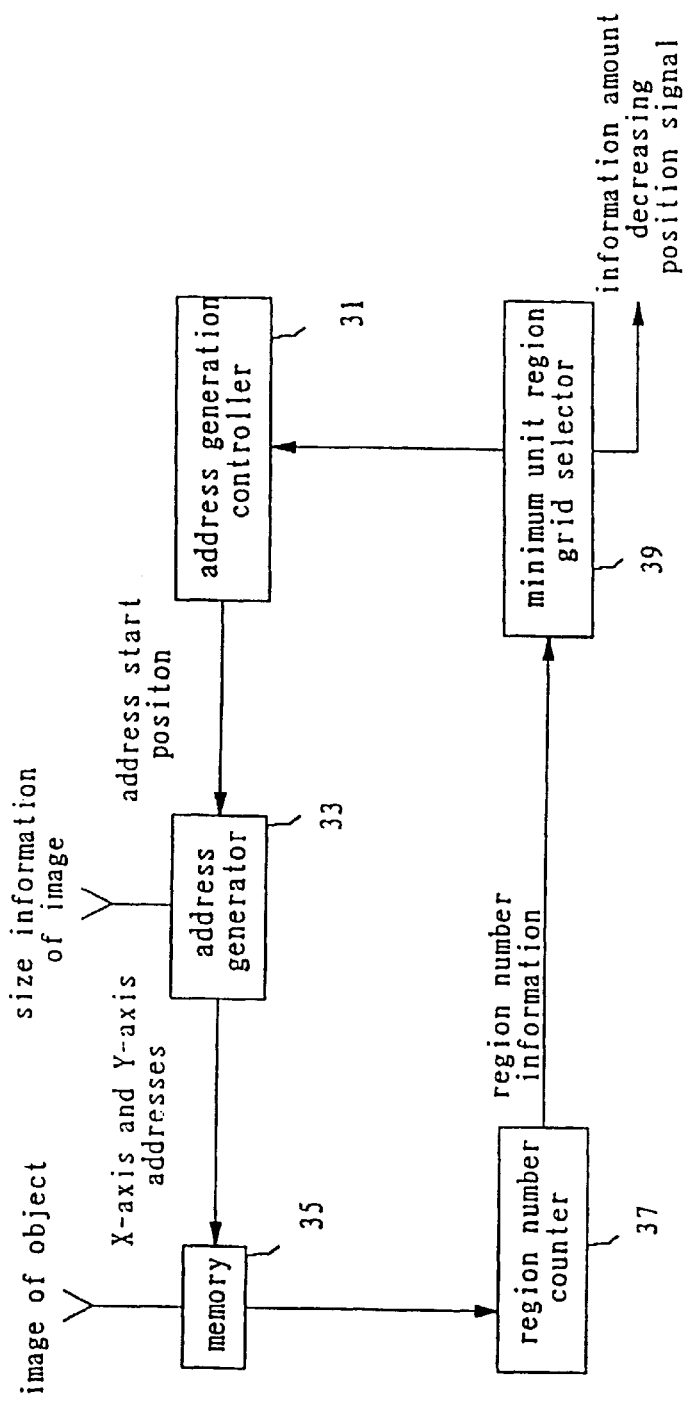
FIG. 4 a block diagram showing a grid moving apparatus according to the present invention.

As illustrated in FIG. 4, reference numeral 31 denotes an address generation controller for moving an address start position at which an address is generated within the range of the X-axis and Y-axis by a predetermined distance, and reference numeral 33 denotes an address generator for generating X-axis and Y-axis addresses so that the image of an object can be segmented to a unit region and sequentially outputted in accordance with an address start position which the address generation controller 31 generates, and reference numeral 35 denotes a memory for sequentially storing an image of an object having predetermined shape information and segmenting and outputting a unit region in accordance with an address which the address generator 33 generates.

Figure 5:
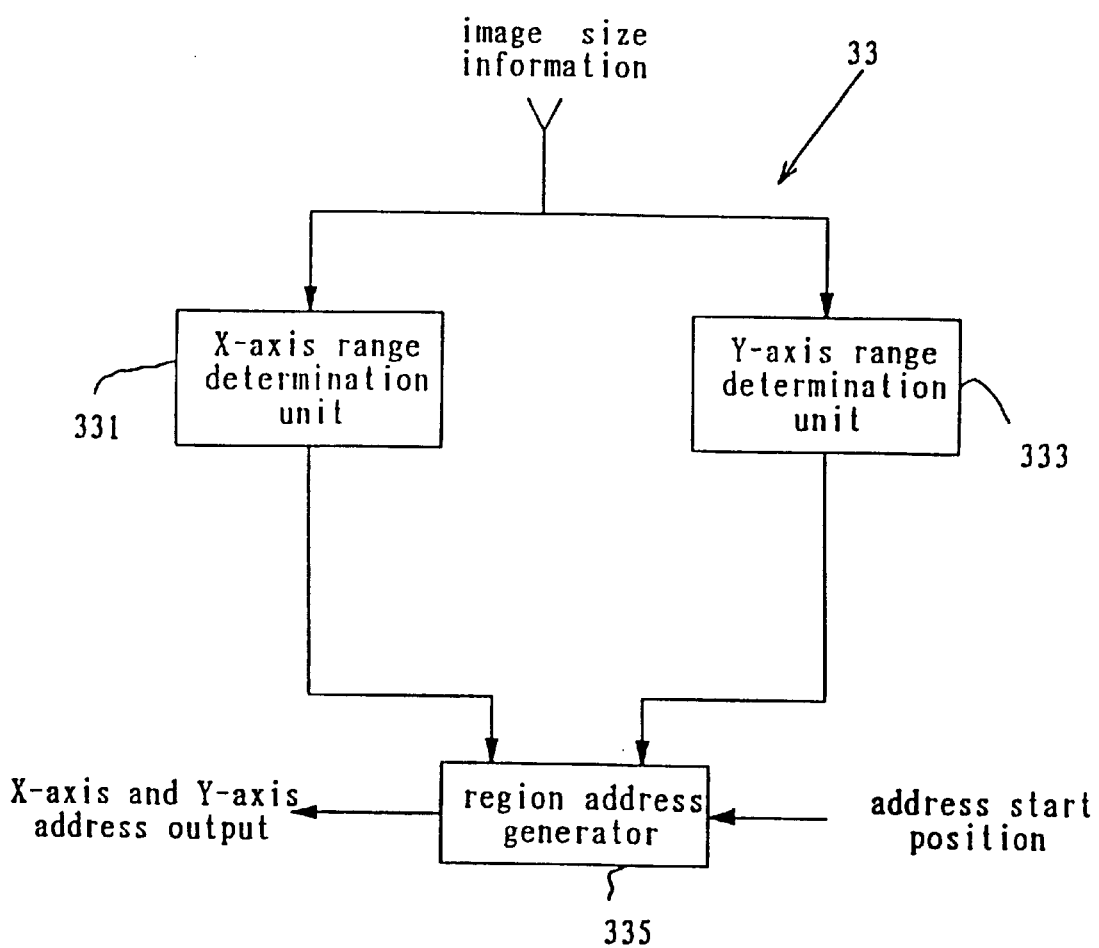
FIG. 5 is a block diagram showing an address generator of FIG. 4 according to the present invention.

As shown in FIG. 5, in the address generator 33, an X-axis range determination unit 331 determines the range of the X-axis of a unit region in accordance with the size information of the inputted image, and the Y-axis range determination unit 333 determines the range of the Y-axis of a unit region in accordance with the size information of the inputted image.

Here, when the ranges of the X-axis and Y-axis are identical, the size of the unit region can be determined using either the range of the X-axis or the range of the Y-axis.

The region address generator 335 of the address generator 33 judges the ranges of the X-axis and Y-axis of the unit region which is determined by the X-axis range determination unit 331 and the Y-axis range determination unit 333, segments the X-axis and Y-axis with respect to the unit region of the image of the object stored in the memory 35 based on the address start position outputted from the address generator controller 31, and sequentially outputs the X-axis and Y-axis addresses of the segmented unit region.

Figure 6:
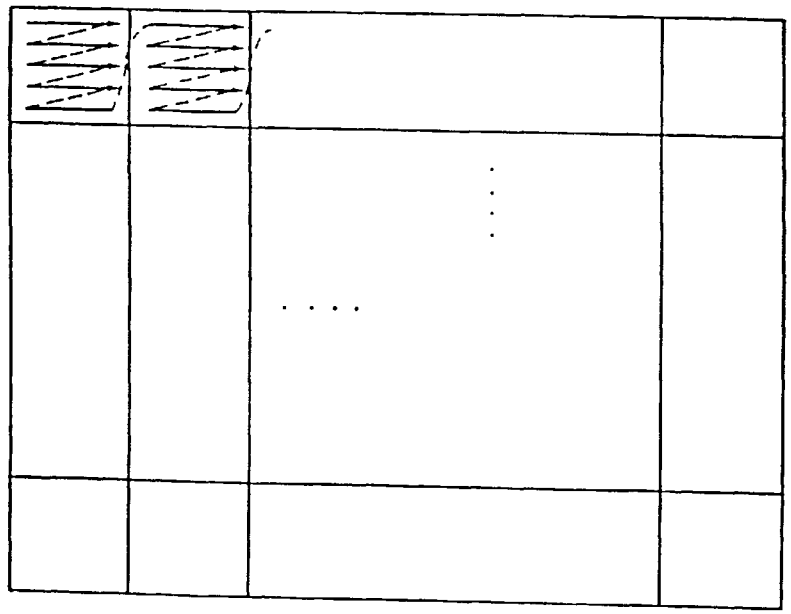
FIG. 6 is a view showing an order that an address generator outputs an image of an object stored in a memory of FIG. 4 by separating in accordance with an X-axis address and a Y-axis address according to the present invention.

The memory 35 separates the image stored therein by one unit region from another unit region in accordance with X-axis and Y-axis addresses which are sequentially generated by the region address generator 335. For example, as shown in FIG. 6, the image of the object of the unit region is sequentially outputted, and then the image of the object of the next unit region is sequentially outputted.

In the drawings, as shown in FIG. 4, reference numeral 37 denotes a region number counter for counting the number of unit regions in which the image of the object among the signals outputted from the memory 35 exists.

Figure 7:
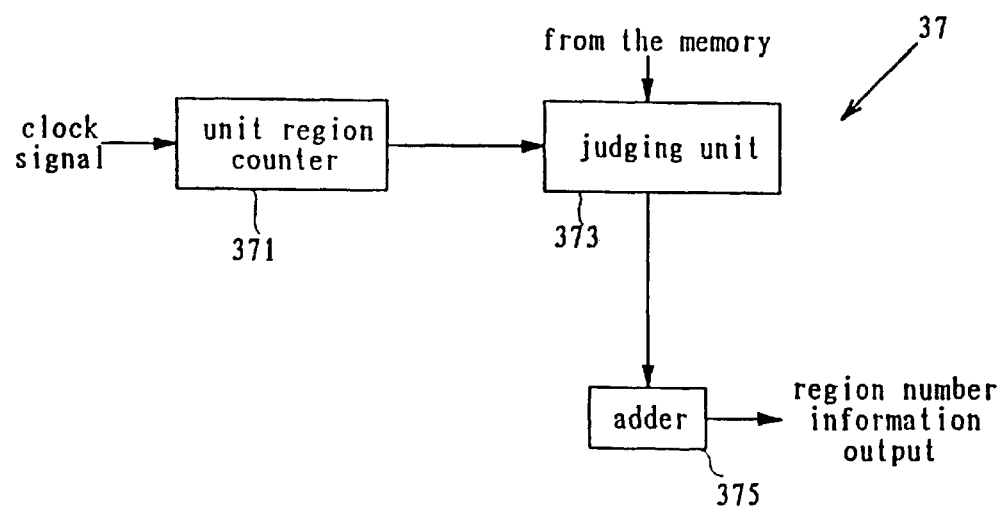
FIG. 7 is a block diagram showing a region number counter of FIG. 4 according to the present invention.

As shown in FIG. 7, in the region number counter 37, a unit region counter 371 counts the clock signal and segments the unit region. A judging unit 373 separates the unit region of the outputted object in accordance with the output signal of the unit region counter 371 and judges as to whether the image of the object exists. An adder 375 adds the judgment signal of the judging unit 373 and then outputs the number of unit regions in which the image of the object exists.

In the drawings, as shown in FIG. 4, reference numeral 39 denotes a minimum unit region grid selection for selecting the X-axis and Y-axis grid positions at which a minimum number of the regions is counted by the region number counter 37.

The minimum unit region grid selector 39 stores the count value when the counting of region number counter 37 is completed, and controls the address generation controller 31 to move the start positions of the X-axis and Y-axis addresses within the range of the X-axis and Y-axis of the unit region by a predetermined distance.

Namely, the minimum unit region grid selector 39 moves the start positions of the X-axis and Y-axis addresses and controls the address generation controller 31 when the counting of the number of the unit regions is completed, and then moves the start positions of the X-axis and Y-axis addresses. The above routines are repeated.

In addition, when the counting of the number of the unit regions in which the image of the object exists by moving the start positions of the X-axis and Y-axis addresses within the ranges of the X-axis and Y-axis is completed, the minimum unit region grid selector 39 judges the start positions of the X-axis and Y-axis at which the unit region of the minimum number among the number of the counted unit regions and determines and outputs the start positions of the judged X-axis and Y-axis addresses as the positions at which the amount of information is reduced.

Figure 8:
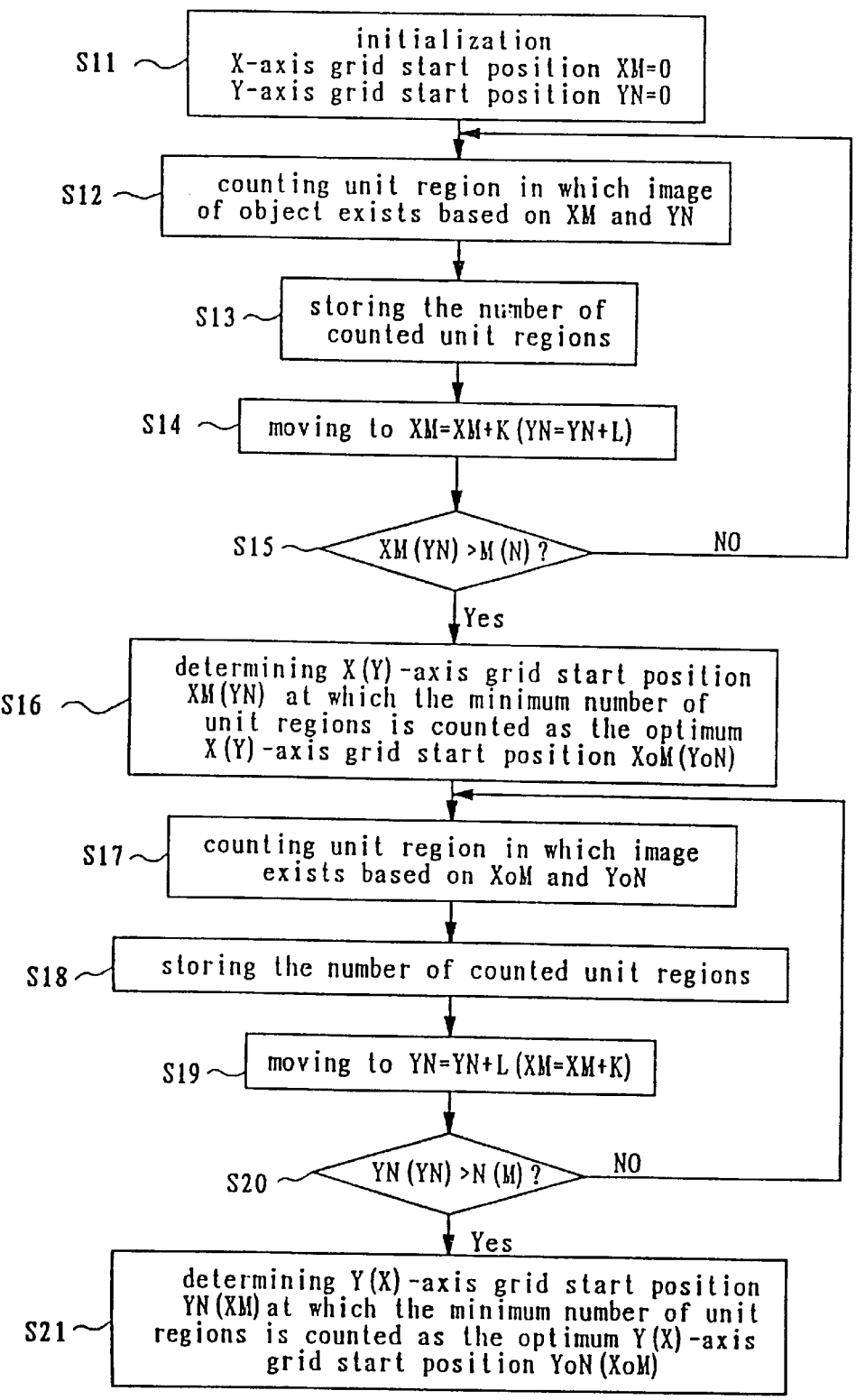
FIG. 8 is a flow chart showing a method for detecting a position at which the amount of information is reduced in a grid moving method according to a first embodiment of the present invention.

FIG. 8 shows a flow chart of the method for detecting a position at which the amount of information is reduced in accordance with a first embodiment of the grid moving method.

In a step S11, X-axis and Y-axis grid start positions XM and YN are initialized so as to detect a position at which the amount of information is reduced in which the number of unit regions in which the image of the object having predetermined shape information exists.

The initial values of the X-axis and Y-axis grid start positions XM and YN are given as XM=0, and YN=0 which are referred to as the initial position of the minimum unit region positioned at the leftmost and uppermost portion among the unit regions with respect to the image of the extracted object.

FIGS. 9A through 9F illustrate a method for adjusting the grid position so that the image of one object "a" in one image frame containing the images of a plurality of objects "a, b, c, and d" each having predetermined shape information is extracted and then exist in one image frame.

As shown in FIG. 9A, the grid is indicated with respect to one image frame containing the images of the plurality of the objects "a, b, c, and d" as shown in FIG. 9B and then the image of the objects is extracted.

There are two methods for extracting the image of the objects. One method is directed to separating and extracting so that each separate image of the objects "a, b, c, and d" can exist within one region, and the other method is directed to extracting the image of the objects "a, b, c, and d" so that more than two images can exist within one region.

As shown in FIG. 9C, the image of one object "a" is extracted, and then the image of the extracted object "a" can exists within the minimum unit region 33 so as to detect a position at which the amount of information is reduced. In addition, the entire grid with respect to the image of the extracted object "a" is called a first extraction grid.

The first extraction grid with respect to the image of the extracted object "a" is segmented into a plurality of unit regions as shown in FIG. 9C.

When the image of the object "a" is extracted, in a step S12, as shown in FIG. 8, the number of the unit regions in which the image of the object "a" exists based on the X-axis and Y-axis grid start position "A" which is initialized in the step S11 is counted.

As shown in FIG. 9C, the unit region positioned at the left side and uppermost portion of the first extraction grid refers to the minimum unit region 33.

In addition, on the assumption that a unit region which is segmented by the grid has an 8×8 number of pixels in the X-axis and Y-axis directions, there are 64 pixels in one unit region.

In the minimum unit region, the initial positions of XM=0, and YN=0 refers to the start position "A" of the first extraction grid. As shown in FIG. 9C, the image of the object "a" exists in 14 unit regions.

When counting of the number of the unit regions in which the image of the object "a" exists is completed, the number of the unit regions which is counted in a step S13 is stored.

In a step S14, the grid is reformed by moving the X-axis grid start position XM along the X-axis in the minimum unit region by a predetermined distance "K", which is same as a length of a pixel along the X-axis, and in a step S15, it is judged as to whether the X-axis grid start position is moved along the X-axis M-times.

Namely, it is judged as to whether the X-axis grid start position XM is moved along the X-axis by more than the size of the unit region.

In the step S15, when the X-axis grid start position XM is not moved along the X-axis M-times, the steps S12 through S15 are performed, and then the X-axis grid start position XM is moved along the X-axis by a distance "K", and the number of the unit regions in which the image of the object "a" exists is counted and then stored. The above routines are repeated.

In the step S15, the entire X-axis grid start position XM is moved M-times, the X-axis grid start position XM in which the unit region having the minimum number in a step S16 is counted is determined as an optimum X-axis grid start position XoM.

In a step S17, the grid is reformed with the optimum X-axis grid start position XoM and the Y-axis grid start position "YN=0", and the number of the unit regions in which the image of the object "a" exists.

The counting of the number of the unit regions is completed in the step S17, in a step S18, the number of the counted unit regions are stored.

In a step S19, the Y-axis grid start position YN is moved along the Y-axis by a predetermined distance "L" which is same as a length of a pixel along the Y-axis, and in a step S20, it is judged as to whether the Y-axis grid start position YN is moved along the Y-axis N-times.

Namely, it is judged as to whether the Y-axis grid start position YN is moved along the Y-axis by more than the size of the unit region.

As a result of the step S20, when the Y-axis grid start position YN is not moved along the Y-axis N-times by a predetermined distance "L", the steps S17 through S20 are performed. The Y-axis grid start position YN is moved based on the optimum X-axis grid start position XoM by a predetermined distance "L", and the number of the unit regions in which the image of the object "a" exists is counted and then stored. The above routines are repeated.

In the step S20, when the Y-axis grid start position YN is moved by a predetermined distance "L" N-times, the Y-axis grid start position XM in which the unit region having the minimum number is counted is determined as the optimum Y-axis grid start position YoN, and the optimum X-axis grid start position XoM and the optimum Y-axis grid start position YoN which are determined in the steps S16 and S21 are outputted to define the position "B" at which the amount of information is reduced, as shown in FIG. 9D. The position "B" is an intersecting position of the optimum X-axis grid start position XoM and the optimum Y-axis grid start position YoN.

Namely, the first embodiment of the present invention of FIG. 8 is directed to the X-axis grid start position XM, at which the minimum number of the unit regions, in which the image of the object exists, is counted by moving the entire grid along the X-axis by a predetermined distance "K" M-times, is counted, as the optimum X-axis grid start position XoM. The Y-axis grid start position YN at which the unit regions having the minimum number in which the image of the object exists is counted by moving the entire grid along the Y-axis by a predetermined distance "L" N-times based on the determined optimum X-axis grid start position XoM is determined as the optimum Y-axis grid start position YoN. The determined X-axis grid start position XoM and the optimum Y-axis grid start position YoN are outputted to define the position at which the amount of information is reduced.

Therefore, the first embodiment of the present invention is directed to moving the entire grid along the X-axis M-times and moving the entire grid along the Y-axis N-times. Namely, the X-axis and Y-axis grid start positions XM and YN are moved M+N times, and then a grid start position "B" defined by the optimum X-axis and Y-axis grid start positions XoM and YoN is detected and outputted.

Figure 10:
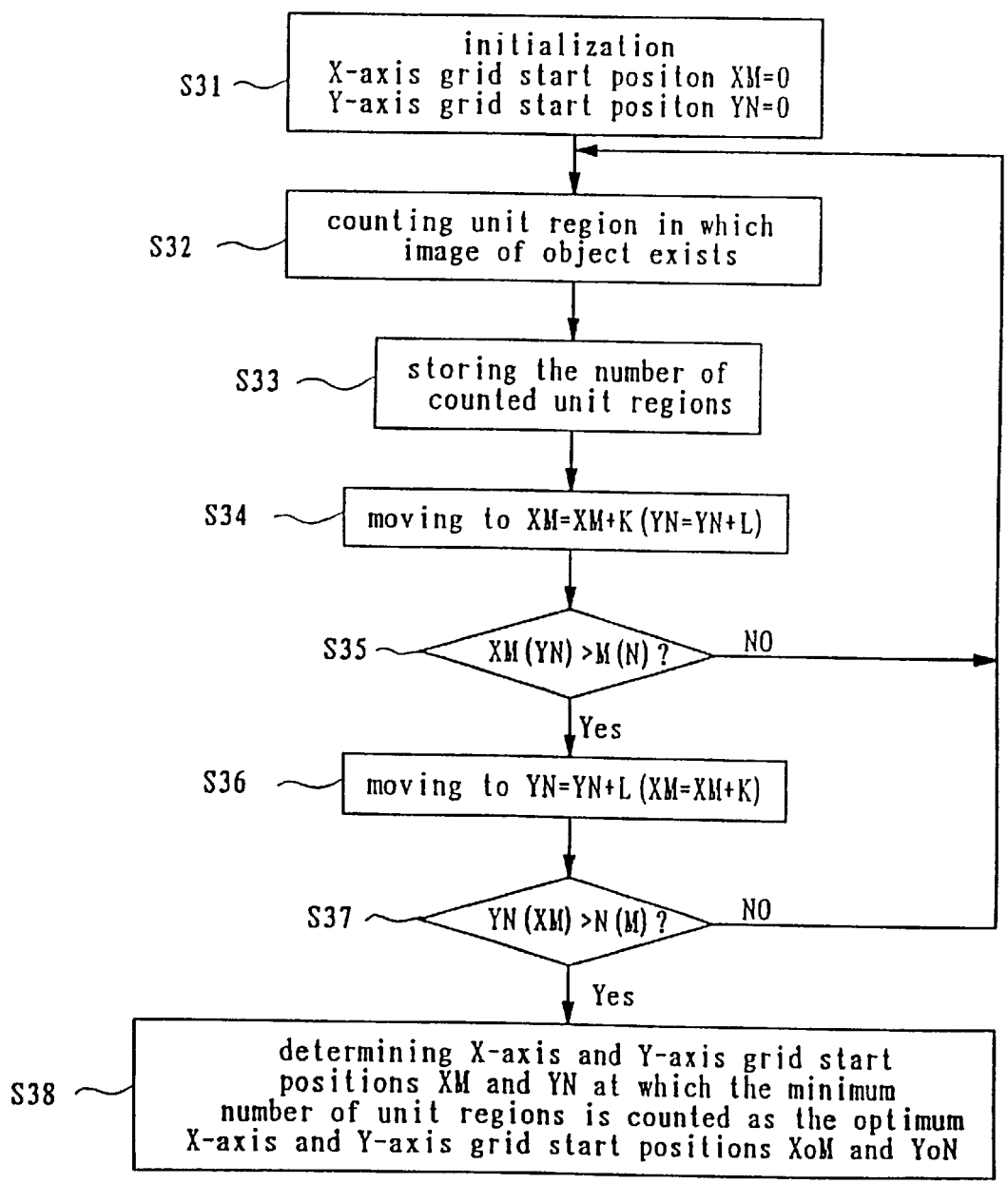
FIG. 10 is a flow chart showing another method for detecting a position at which the amount of information is reduced in a grid moving method according to a second embodiment of the present invention.

FIG. 10 shows a method for detecting a position at which the amount of information is reduced in the compaction method according to a second embodiment of the present invention.

In a step S31, the X-axis and Y-axis grid start positions XM and YN are initialized as XM=0, and YN=0 so as to detect the optimum X-axis and Y-axis grid start positions XoM and YoN in which the number of the unit regions in which the image of the object exists becomes minimum.

In a step S32, the number of the unit regions in which the image of the object exists is counted based on the X-axis and Y-axis grid start positions XM=0, and YN=0 which are initialized in the step S31, and in a step S33, the number of the unit regions counted in the preceding step is stored.

In a step S34, the X-axis grid start position XM is moved along the X-axis by a predetermined distance "K", and in a step S35, the X-axis grid start position XM is moved along the X-axis more than M-times, and then it is judged as to whether it is moved more than the size of a unit region.

As a result, when the X-axis grid start position XM is not moved along the X-axis more than M-times in the steps S35, the steps S32 through S35 are performed. The X-axis grid start position XM is moved along the X-axis by a predetermined distance "K", and the number of the unit regions in which the image of the object exists is counted and stored. The above routines are repeated.

As a result, when the X-axis grid start position XM is moved along the X-axis more than M-times in the step S35, in a step S36, the Y-axis grid start position YN is moved along the Y-axis by a predetermined distance "L".

In a step S37, it is judged as to whether the Y-axis grid start position YN is moved along the Y-axis by a predetermined distance "l" more than N-times.

As a result, when the Y-axis grid start position YN is not moved along the Y-axis more than N-times in the step S37, the steps S32 through S37 are performed. The Y-axis grid is moved along the Y-axis by a predetermined distance "L", and then the X-axis grid is moved along the X-axis within the range of the unit region by a predetermined distance "K", and the number of the unit regions in which the image of the object exists is counted and stored. The above routines are repeated.

As a result, when the Y-axis grid start position YN is moved along the Y-axis more than N-times in the step S37, the X-axis grid start position XM and the Y-axis grid start position YN at which the unit region having the minimum number in which the image of the object exists is counted are determined as an optimum X-axis grid start position XoM and an optimum Y-axis grid start position YoN, and then the determined optimum X-axis and Y-axis grid start positions XoM and YoN are outputted to define the position at which the amount of information is reduced.

The second embodiment of the present invention of FIG. 10 is directed to moving the entire grid along the X-axis by a predetermined distance "K" M-times and to moving the entire grid along the Y-axis by a predetermined distance "L" M-times, and further moving the entire grid along the X-axis by a predetermined distance "K" M-times and to moving the entire grid along the X-axis by a predetermined distance "L" M-times so as to count the number of the unit regions in which the image of the object exists. In addition, the X-axis and Y-axis grid start positions XM and YN at which the unit region having the minimum number is counted are determined as the optimum X-axis and Y-axis grid positions to define a position at which the amount of information is reduced and then are outputted.

Therefore, the second embodiment of the present invention of FIG. 10 is directed to moving the X-axis and Y-axis grid start position XM and YN by a predetermined distance "K" and "L" M×N times and outputting the X-axis and Y-axis grid start positions XM and YN, at which the minimum number of unit regions is counted.

The embodiments of the present invention of FIGS. 8 and 10 are directed to moving the grid start position along the X-axis by a predetermined distance "K", to moving the grid start position "A" along the Y-axis by a predetermined distance "L" and to detecting the optimum X-axis and Y-axis grid start positions XoM and YoN.

However, the embodiment of the present invention of FIGS. 8 and 10 are further directed to gradually moving to the Y-axis by a predetermined distance "L" and to the X-axis by a predetermined distance "K" and detecting the optimum X-axis and Y-axis grid start positions XoM and YoN and outputting the position at which the amount of information is reduced.

With regard to the first and second embodiments of the grid moving methods, as shown in FIGS. 8 and 10, a way of determining the grid start position of X-axis first followed by determining the grid start position of Y-axis is described for illustrative purpose.

As indicated in the brackets of FIGS. 8 and 10, the grid moving methods can also be processed by determining the grid start position of Y-axis first followed by determing the grid start position of X-axis.

Figure 11:
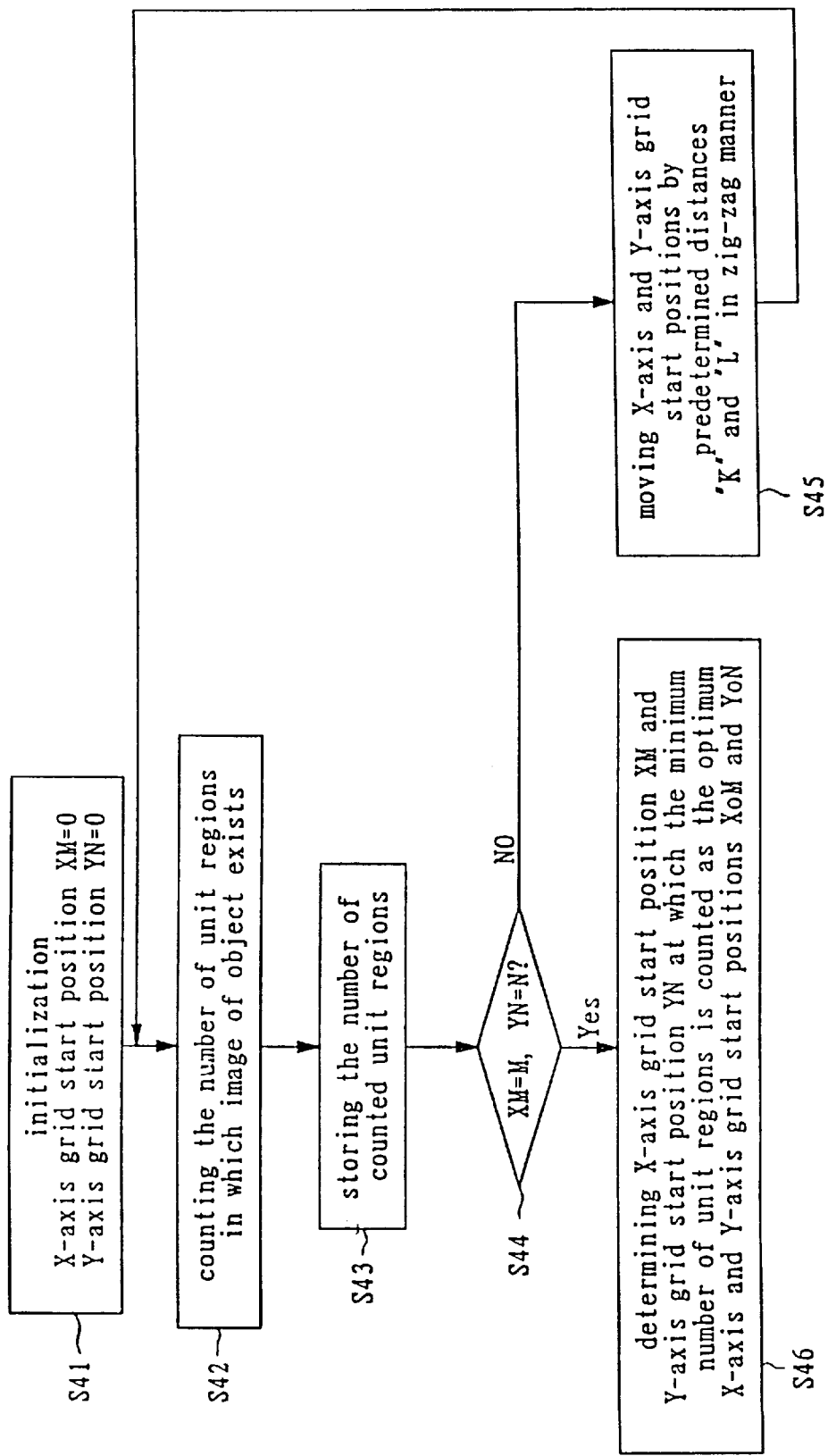
FIG. 11 is a flow chart showing another method for detecting a position at which the amount of information is reduced in a grid moving method according to a third embodiment of the present invention.

FIG. 11 shows a method for detecting a position at which the amount of information is reduced in the grid moving method according to a third embodiment of the present invention.

In a step S41, the X-axis and Y-axis grid start positions XM and YN are initialized to 0 so as to detect the optimum X-axis and Y-axis grid start positions XoM and YoN at which the number of the unit regions in which the image of the object exists becomes minimum.

In a step S42, the number of the unit regions in which the image of the object exists is counted from the initialized X-axis and Y-axis grid start positions XM and YN, and in a step S43, the number of the counted unit regions is stored.

In a step S44, the X-axis grid start position XM is moved along the X-axis M-times, and it is judged as to whether the Y-axis grid start position YN is moved along the Y-axis N-times.

As a result, when the X-axis grid start position XM is not moved along the X-axis more than M-times or when the Y-axis grid start position YN is not moved along the Y-axis more than N-times, in a step S45, the X-axis and Y-axis grid start positions XM and YN are moved within the unit region in a zig-zag manner by predetermined distances "K" and "L", and then the steps S42 through S45 are performed.

Thereafter, the number of the unit regions in which the image of the object exists is counted and stored. The routines of moving the X-axis and Y-axis grid start positions XM and YN are repeated.

Here, there are two methods of moving the X-axis and Y-axis grid start positions XM and YN in a zig-zag manner by predetermined distance "K" and "L". For example, as shown in FIGS. 12A and 12B, there is shown a first method for moving to the direction indicated by the arrow and a second method for moving to the direction indicated by the arrow.

In the step S44, when the X-axis grid start position XM is moved along the X-axis M-times, and the Y-axis grid start position YN is moved along the Y-axis N-times, in a step S46, the X-axis grid start position XM and the Y-axis grid start position YN at which the unit regions of the minimum number are counted are determined as the optimum X-axis grid start position XoM and the optimum Y-axis grid start position YoN, and then the determined optimum X-axis grid start position XoM and the determined optimum Y-axis grid start position YoN are outputted to define the position "B".

Namely, another embodiment of the present invention of FIG. 11 is directed to moving the entire grid within the range of the X-axis and Y-axis of the unit region in a zig-zag manner and to counting the number of the unit regions in which the image of the object exists.

Therefore, the third embodiment of the present invention of FIG. 11 is directed to moving the X-axis and Y-axis grid start positions XM and YN by predetermined distances "K"

and "L" M×N times and determining the X-axis and Y-axis grid start positions XM and YN, at which a minimum number of unit regions is counted, as the position "B", as shown in FIG. 9D, at which the amount of information is reduced.

FIG. 9D shows an example for reforming the grid to the position at which the amount of information is reduced which is determined in accordance with the embodiments of the present invention of FIGS. 8, 10, and 11.

Here, the optimum X-axis grid start position XoM which is referred to as the position at which the amount of information is reduced existing in the unit region of the minimum number of the image of the object "a" is five (M=5), and the optimum Y-axis grid start position YoN is six (N=6).

In addition, as a result that the optimum X-axis and Y-axis grid start positions XoM and YoN are moved along the image position of the object "a", the number of the unit regions in which the image of the object "a" exists is reduced from 14 to 7.

In the above embodiments, the square-shaped unit region or the rectangular-shaped unit region which are defined by the X-axis and Y-axis are described.

Various forms of the unit region may be used so as to implement the objects of the present invention.

For example, as shown in FIGS. 2A through 2F, the 45° rotated square, the hexagonal-shaped form or the like may be used. In addition, more than two different shapes which are capable of dividing the image frame into a predetermined shape at a regular interval may be combined so as to form the unit regions.

Figure 13A:
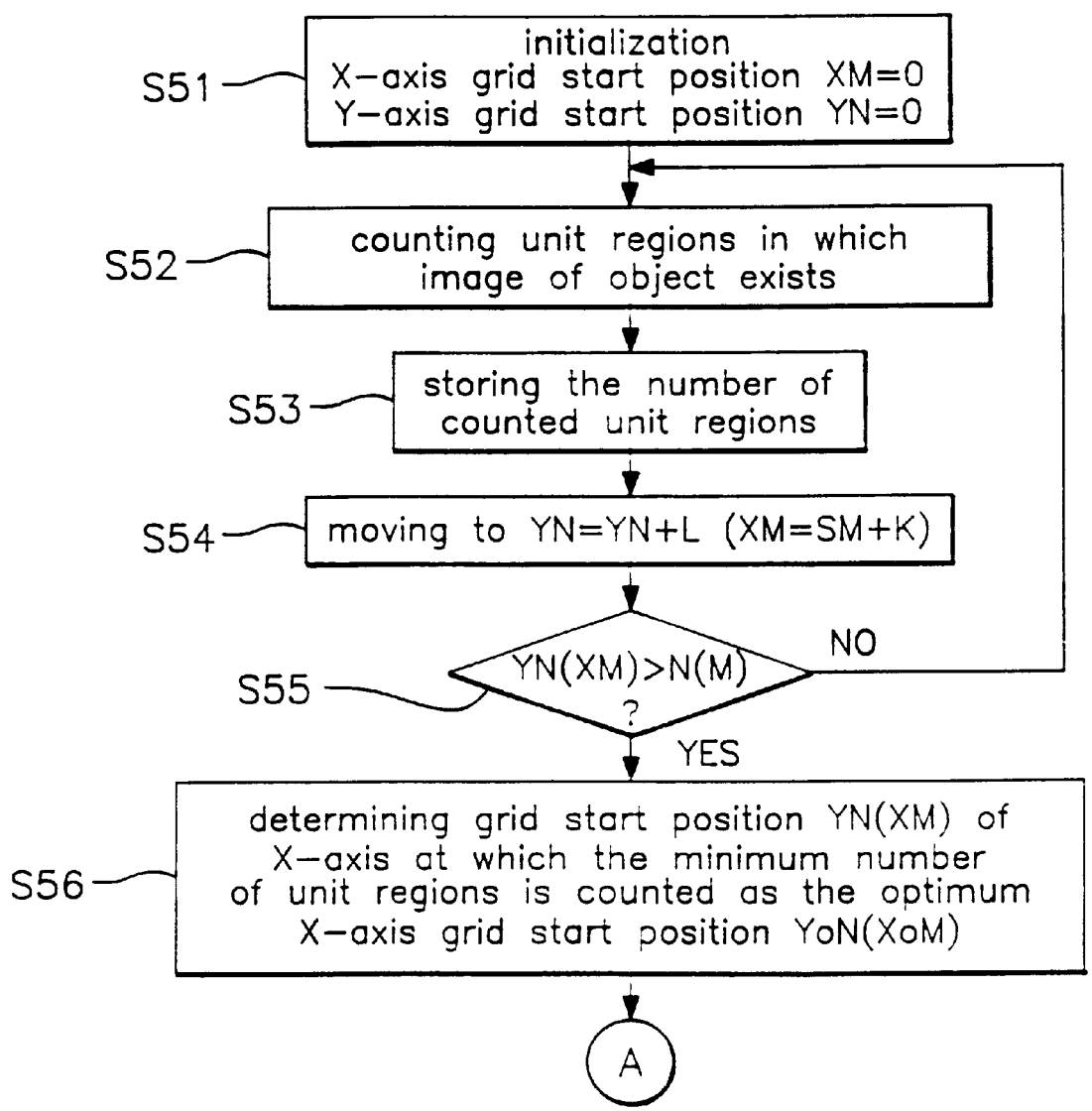
FIG. 13 is a view showing another method for detecting a position at which the amount of information is reduced in a grid moving method according to a fourth embodiment of the present invention.
Figure 13B:
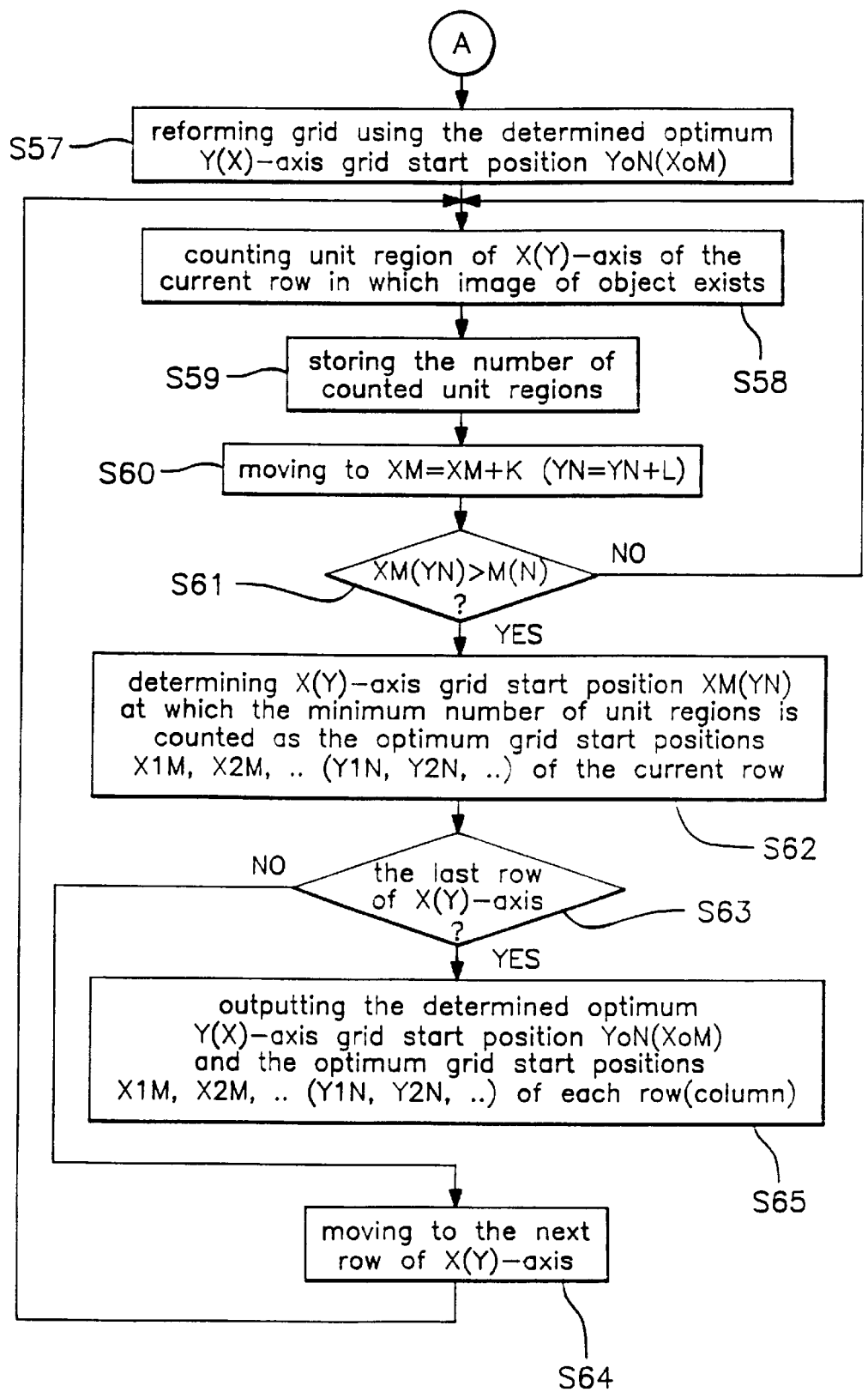

FIG. 13 shows a flow chart of a method for detecting the position at which the amount of information is reduced in a grid moving method in accordance with a fourth embodiment of the present invention.

In a step S51, the X-axis and Y-axis grid start positions XM and YN are initialized as 0 so as to detect the position at which the number of the unit regions in which the image of the object exists, becomes minimum.

In a step S52, the number of the unit regions in which the image of the object exists from the X-axis and Y-axis grid start positions XM=0 and YN=0 which are initialized in the step S51 is counted, and in a step S53, the number of the unit regions counted in the step S52 is determined.

In a step S54, the Y-axis grid start position YN is moved along the Y-axis by a predetermined distance "L", and in a step S55, it is judged as to whether the Y-axis grid start position YN is moved along the Y-axis more than N-times.

As a result, when the Y-axis grid start position YN is not moved along the Y-axis more than N-times, the steps S52 through S55 are performed. The routines that the Y-axis grid start position YN is moved along the Y-axis by a predetermined distance "L", and the number of the unit regions in which the image of the object exists is counted and stored are repeated.

As a result, when the Y-axis grid start position YN is moved along the Y-axis by a predetermined distance "L" more than N-times in the step S55, in step S56, the Y-axis grid start position YN at which a minimum number of unit regions exists is determined as the optimum Y-axis grid start position YoN.

When the optimum Y-axis grid start position YoN at which the minimum number of unit regions exists is determined in the step S56, in step S57, the grid is reformed based on the determined optimum Y-axis grid start position YoN, and in step S58, the unit region of the current X-axis row in which the image of the object exists is counted.

Namely, as shown in FIG. 9E, the unit regions in which the image of the object among the unit regions of the first row of the X(1) row in the X-axis direction exists is counted.

In step S59, the number of the counted unit regions is stored.

In step S60, the grid start position XM of the X(1) row is moved along the X-axis by a predetermined distance "K", and in step S61 it is judged as to whether the X-axis grid start position XM of the X(1) row is moved along the X-axis by a predetermined distance "K" more than M-times.

As a result, when the X-axis grid start position XM of the X(1) row is not moved along the X-axis more than M-times in the step S61, the steps S58 through S61 are performed, and the routines that the X-axis grid start position XM of the X(1) row is moved along the X-axis by a predetermined distance "K", and the unit region in which the image of the object among the unit regions of the X(1) row exists is counted and stored are repeated.

In the step S61, when the grid start position XM of the X(1) row is moved by a predetermined distance M-times, in a step S62, the grid start position XM of the X(1) row at which the minimum number of unit regions among the currently counted unit regions is counted is determined as the optimum X(1) row grid start position X1M.

In step S63, it is judged as to whether the row refers to the last row of the X-axis, and when the row is not referred to as the last row of the X-axis, in a step S64, the row is moved along the next row, and then the steps S58 through S64 are performed.

The above routines are repeatedly performed, and the row of the X-axis is sequentially moved along X(1), X(2), X(3), X(4), and X(5), and the grid start position XM of the X(1), X(2), X(3), X(4), and X(5) rows at which the minimum number of unit regions in which the image of the object exists is counted are determined as the grid start positions (X1M, X2M, . . . ) of the optimum X(1), X(2), X(3), X(4), and X(5) rows.

In the step S64, when the row refers to the last row of the X-axis, the optimum Y-axis grid start position YoN, the optimum grid start positions (X1M, X2M, . . . ) of the X(1), X(2), X(3), X(4), and X(5) are outputted as positions at which the amount of the information is reduced.

Figure 14B:
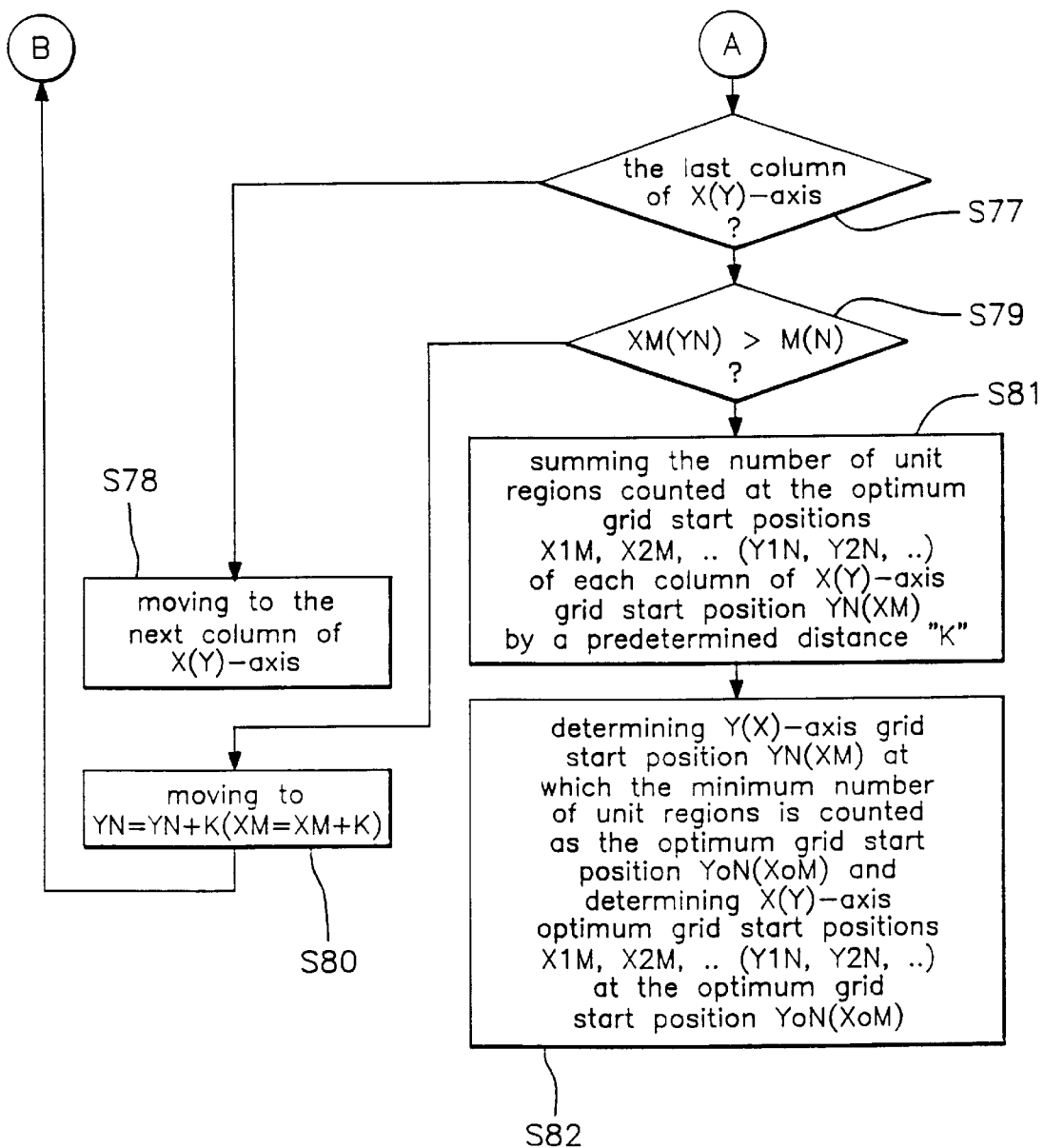
FIG. 14 is a view showing another method for detecting a position at which the amount of information is reduced in a grid moving method according to a fifth embodiment of the present invention.

FIG. 14 shows the flow chart of a method for detecting the positions at which the amount of information is reduced in the grid moving method in accordance with a fifth embodiment of the present invention.

In step S71, the X-axis and Y-axis grid start positions XM and YN are initialized as 0 so as to detect the positions at which the number of the unit regions in which the image of the object exists becomes minimum.

In step S72, the unit region in which the image of the object exists among the unit regions of the current X-axis row is counted.

Namely, the unit region in which the image of the object exists among the unit regions of the X(1) row is detected and counted.

When the count of the unit regions is completed in the step S72, in step S73, the number of counted unit regions is stored.

In step S74, the X-axis grid start position XM of the X(1) row is moved along the X-axis by a predetermined distance "K", and in step S75, it is judged as to whether the X-axis grid start position XM of the X(1) row is moved by a predetermined distance "K" more than M-times.

In the step S75, when the grid start position XM of the X(1) is not moved by a predetermined distance "K" more than M-times, the steps S72 through S75 are performed. The routine that the X-axis grid start position XM of the X(1) row is moved by a predetermined distance "K", and the number of the unit regions in which the image of the object exists is counted is repeatedly performed.

In the step S75, when the X-axis grid start position XM of the X(1) row is moved along the X-axis by a predetermined distance "K" more than M-times, the grid start position XM of the X(1) row at which the minimum number of unit regions among the currently counted unit regions of the X(1) is counted is determined as the optimum X(1) row grid start position X1M.

In step S77, it is judged as to whether the row refers to the last row of the A-axis, and when the row is not the last row of the X-axis, in step S78, the row is sequentially moved along the next row of the X-axis, namely, to the X(2), X(3), X(4), and X(5) rows, and the steps S72 through S78 are performed, and the routines that the grid start position XM of the X(2), X(3), X(4), and X(5) at which the minimum number of unit regions in which the image of the object exists is counted is determined as the grid start positions (X1M, X2M, . . . ) of the optimum X(2), X(3), X(4), and X(5) rows are repeatedly performed.

In the step S77, when the row refers to the last row of the X-axis, in step S79, it is judged as to whether the Y-axis start position YN is moved along the Y-axis by a predetermined distance "L" more than N-times.

In the step S79, when the Y-axis grid start position YN is not moved along the Y-axis by a predetermined distance "L" more than N-times, in step S80, the Y-axis grid start position YN is moved along the Y-axis by a predetermined distance "L", and the steps S72 through S80 are repeatedly performed.

Namely, the number of the unit regions in which the image of the object exists is counted by moving the Y-axis grid start position YN along the Y-axis by a predetermined distance "L" and by sequentially moving the grid start position XM of the X(1), X(2), X(3), X(4), and X(5) by a predetermined distance "K" from the position to which the Y-axis grid start position YN is moved. In addition, the grid start position XM of the X(1), X(2), X(3), X(4), and X(5) rows at which the minimum number of unit regions is counted is sequentially determined as the grid start positions (X1M, X2M, . . . ) of the optimum X(1), X(2), X(3), X(4), and X(5) rows.

In the step S80, when the Y-axis grid start position YN is moved by a predetermined distance "L" more than N-times, in step S81, the numbers of the unit regions which are counted at the grid start positions (X1M, X2M, . . . ) of the optimum X(1), X(2), X(3), X(4), and X(5) rows which are determined at the position to which the Y-axis grid start position YN is moved are all summed.

In addition, in step S82, as a result of the sum, the position at which the minimum number of unit regions is counted is judged as the Y-axis grid start position YN, and the judged Y-axis grid start position YN is determined as the optimum Y-axis grid start position YoN. The grid start positions (X1M, X2M, . . . ) of the X(1), X(2), X(3), X(4) and X(5) rows at which the minimum number of unit regions of the minimum number is counted is judged as the optimum Y-axis grid start position YoN are determined as the grid start positions (X1M, X2M, . . . ) of the optimum X(1), X(2), X(3), X(4) and X(5) rows. In addition, the determined optimum Y-axis grid start position YoN and the grid start positions (X1M, X2M, . . . ) of the X(1), X(2), X(3), X(4) and X(5) are outputted as the position at which the amount of information is reduced.

The result of the reformation of the grid in accordance with the position at which the amount of information is reduced which is obtained by the embodiments of FIGS. 13 and 14 are shown in FIG. 9E.

Here, in the fourth and fifth embodiments of FIGS. 13 and 14, an example of moving the Y-axis grid start position YN and then the X-axis grid start position XM so as to detect the optimum grid start position is described.

Namely, the present invention is directed to detecting the position at which the amount of information is reduced in which the image of the object exists in the minimum number of unit regions by changing the X-axis grid start position XM and Y-axis grid start position YN as shown in FIGS. 13 and 14.

Similarly, the result of the reformation of the grid to the position at which the amount of information is reduced by changing the X-axis grid start position XM and the Y-axis grid start positions in each column (Y1N, Y2N, Y3n, Y4N and Y5N) is shown in FIG. 9F.

With regard to the fourth and fifth embodiments of the grid moving methods, as shown in FIGS. 13 and 14, a way of determining the grid start position of each row of X-axis after determining the optimum Y-axis grid start position is described for illustrative purpose.

As indicated in the brackets of FIGS. 13 and 14, the grid moving methods can also be processed by determining the grid start position of each column after determining the optimum X-axis grid start position.

In addition, in the second and third embodiments of the present invention of FIGS. 10 and 11, the square-shaped unit region and the rectangular-shaped unit region have been explained. So as to implement the embodiments of the present invention, the unit region may be formed in various shapes. The unit regions may be moved by separating the row of the X-axis or the row of the Y-axis. In addition, the unit region may be formed in a 45° rotated square shape and then the unit region is segmented by a slant grid. The unit region may be also formed of movable slant grid.

Figure 2A:
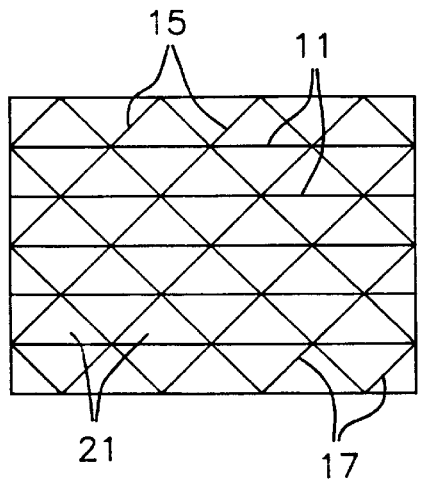
FIGS. 2A through 2F are views showing various shapes of a conventional unit region.
Figure 2B:
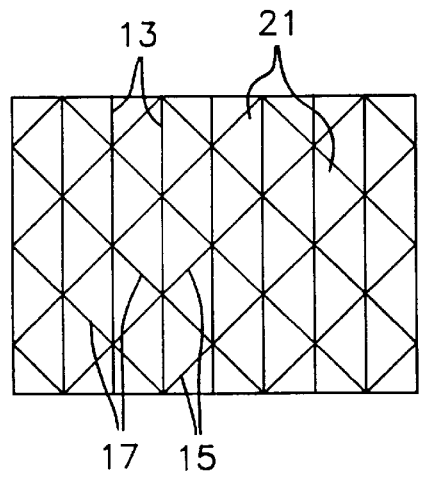

For example, when detecting the position at which the amount of information is reduced by moving the unit regions of a row to the X-axis, as shown in FIG. 2A, a unit region may be formed as a triangle using two slant grids 15 and 17 opposed to the X-axis grid 11. When detecting the position at which the amount of information is reduced by moving the unit region of the row of the Y-axis to the X-axis, as shown in FIG. 2B, a unit region may be formed as a triangle using two slant grids 15 and 17 opposed to the Y-axis grid 13.

Figure 2C:
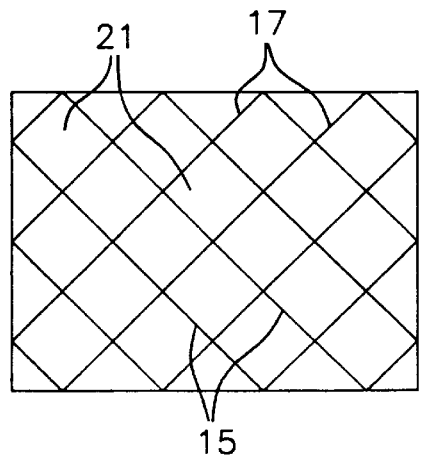
Figure 2D:
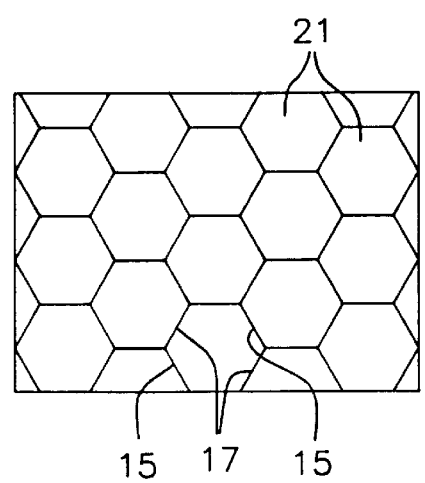
Figure 2E:
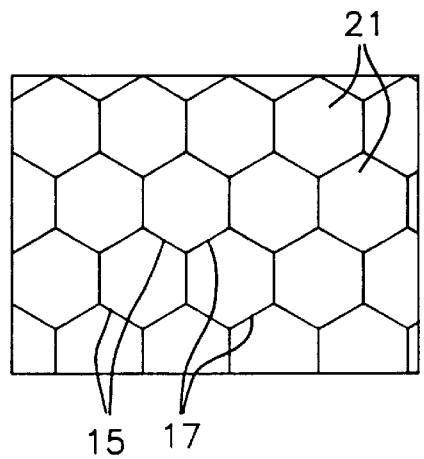
Figure 2F:
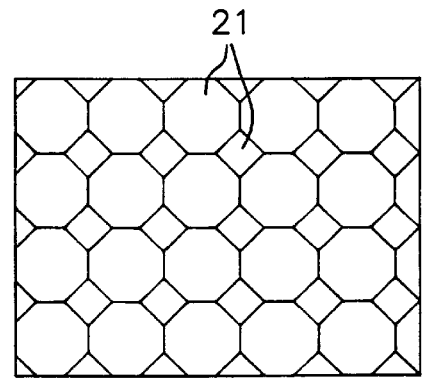
Figure 3A:
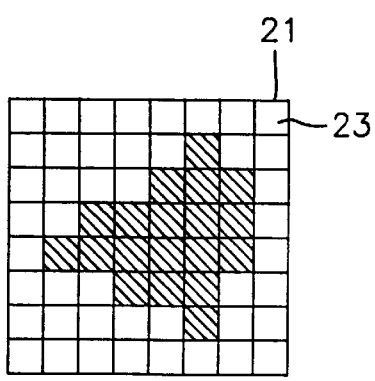
FIGS. 3A through 3F are views showing a conventional shape adaptive discrete cosine transform process.
Figure 3B:
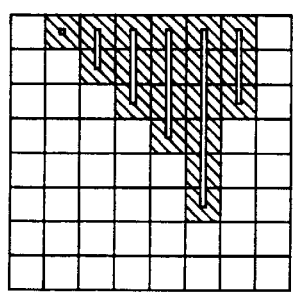
Figure 3C:
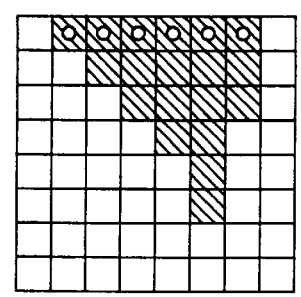
Figure 3D:
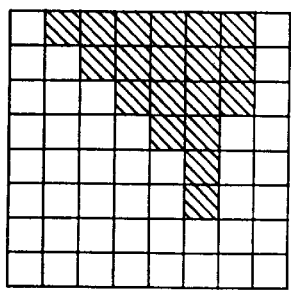
Figure 3E:
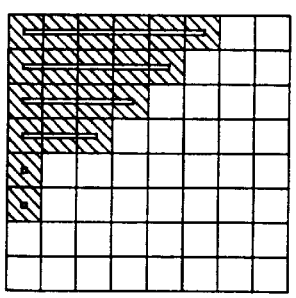
Figure 3F:
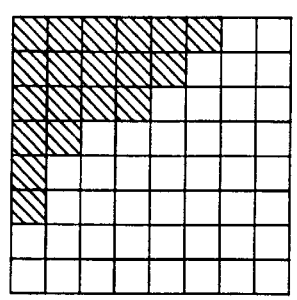

In addition, when detecting the position at which the amount of information is reduced by moving a unit region in an inclination manner, as shown in FIG. 2C, the unit region may be formed as a 45° rotated square using two opposed slant grids 15 and 17.

In the present invention, a method of extracting the image of the object "a" and positioning it into the minimum number of unit regions has been described.

So as to implement the embodiment of the present invention, more than two images of the objects "a, b, c, and d" are selectively extracted, and then the position as which the amount of information is reduced existing in the minimum number of unit regions may be detected.

In addition, the predetermined distances K and L of the X-axis and Y-axis grid start positions XM and YN have the reference of the number of the pixels existing in the range of the unit region.

For example, the X-axis and Y-axis grid start positions XM and YN may be moved by the length of the unit pixel within the range of the X-axis and Y-axis of the unit region.

However, since the information with respect to the chrominance signal from the video signal is referred to ½ of the information of the luminance signal, the moving distances K and L" of the X-axis and Y-axis grid start position in XM and YN consideration of the information with respect to the chrominance signal and the luminance signal are preferably referred to as the length of two pixels.

In addition, in this embodiment of the present invention, an example that the position at which the image of the object exists in the minimum number of unit regions has been described as one position; but a plurality positions at which the amount of information is reduced may be considered.

Therefore, in the present invention, when a plurality of positions at which the amount of information is reduced are considered, the unit region is divided into sub-regions having the size of (M/2)×(N/2), and the grid start positions XM and YN are moved by predetermined distances "K and L" within the range of the X-axis and Y-axis of the divided sub-regions, and the X-axis and Y-axis grid start positions at which the image of the object exists in the minimum number of unit regions is detected and outputted as the position at which the amount of information is reduced.

Namely, on assumption that the size of the unit region is formed of 16×16 pixels, the sub-region has 8×8 pixels. In addition, the grid start positions XM and YN are moved by predetermined lengths "K and L" within the number of pixels of the sub-region which is divided into 8×8 pixels.

Thereafter, the X-axis and Y-axis grid start positions at which the minimum number of unit regions in which the image of the object exists is detected, and then the X-axis and Y-axis grid start positions are outputted as the positions at which the amount of information is reduced.

In addition, which a unit region is divided into the sub-regions, a plurality of positions at which the amount of information is reduced for counting the minimum number of unit regions may be generated.

Therefore, in the present invention, when a unit region is divided into the sub-regions, and a plurality of the optimum X-axis and Y-axis grid start positions XoM and YoN are generated, a proper one among them should be selected.

At this time, as one position to be selected becomes closer to the initial X-axis and Y-axis grid start positions XM=0 and YN=0, the value of the motion vector becomes smaller, and the information amount is decreased. In addition, when estimating the motion, since the estimation error occurrence rate becomes lower, the X-axis and Y-axis grid start positions in which the distance is nearest therebetween based on the initial grid start positions XM=0 and YN=0 are determined as the positions at which the amount of information is reduced.

The results of FIGS. 15 and 16 were obtained by adjusting the positions of the X-axis and y-axis grids with respect to the image of the object and coding using a computer simulation.

The image used for the object was that of a young women and an old woman, and the number of the image frames was 50, respectively.

Here, the compaction with respect to the image of the object in the conventional art refers to a shape adaptive discrete cosine transform method. Here, a fixed block grid (FBG) shape adaptive discrete cosine transform (SADCT) refers to a method of adjusting the position of the X-axis grid and Y-axis grid and coding in accordance with the first, second and third embodiments of FIGS. 8, 10, and 11.

In the fourth embodiment of FIG. 13, a method of adjusting and coding the position of the X-axis grid and Y-axis grid in accordance with the X-axis grid and Y-axis grids refers to a variable block grid (VBG) shape adaptive discrete cosine transform (SADCT) 1-X method and a variable block grid (VBG) shape adaptive discrete cosine transform (SADCT) 1-Y method.

In the fifth embodiment of FIG. 14, a method of adjusting and coding the position of the X-axis grid and Y-axis grid in accordance with the X-axis grid and Y-axis grids refers to a variable block grid (VBG) shape adaptive discrete cosine transform (SADCT) 2-X method and a variable block grid (VBG) shape adaptive discrete cosine transform (SADCT) 2-Y method. In the fifth embodiment of FIG. 14, a method of separating and extracting the image of the object and then coding in accordance with the X-axis grid is referred to a variable block grid (VBG) shape adaptive discrete cosine transform (SADCT) 2-X method (by the object).

In this embodiment, an image of the object between N-1 and N frames of the original image is extracted, and the result between the conventional compaction method which is directed to performing the shape adaptive discrete cosing transform (SADCT) without varying the position of the X-axis grid and Y-axis grid from the extracted image and the compaction method of the present invention was analyzed.

The comparison method was conducted by judging how much transmission bit rate occurs as the occurrence bits per pixel (BPP) per frame and the number of regions per frame when the pixel of the object is identical with the peak signal to noise ratio (PSNR) which is the objective picture equality evaluation reference.

FIG. 15 shows the average result which is obtained by an experiment of 50 frames with respect to the image of the young woman.

As shown in the table of FIG. 15, in the conventional method of performing the SADCT without varying the X-axis grid and Y-axis grid, the average peak signal to noise ratio (PSNR) value was 36.46 db, the number of the average occurrence bits was 751, and the number of the average BPP was 1.21, and the number of the average unit regions was 20.71.

Meanwhile, after reforming the grid using the X-axis and Y-axis which is moved so that the image of the object can exist in the minimum number of unit regions, the FBG-SADCT was performed. As a result, the average PSNR was 36.37 db, and the number of the average occurrence bits was 719, and the average BPP was 1.16, and the number of the average unit regions was 18.65.

In a state that the objective PSNR is similar, the FBG-SADCT of the present invention had the average number of the occurrence bits reduced by 32 bits, the BPP was reduced by 0.05, and the number of the average unit regions was reduced by 2.06.

In addition, when moving the X-axis grid and Y-axis grid after separating and dividing the image of the object a better result appeared according to the result of the embodiments of the present invention.

As a result of the VBG-SADCT 2-X method with respect to the image of the object, the average PSNR value was 36.3 db, and the number of the average occurrence bits was 694, and the average BPP was 1.12, and the number of the average regions was 16.82.

Therefore, in the present invention, it is possible to reduce the average occurrence bit rate by 57 bits performing the VBG-SADCT by the image of the object after adjusting the position of the grid in accordance with the position in which the image of the object exists compared to the conventional method which is directed to performing the SADCT without moving the position of the grid in accordance with the position at which the image of the object exists. In addition, in the present invention, the average BPP is reduced by 0.09, and the number of the average unit regions is reduced by 3.89.

FIG. 16 shows the result which is obtained by performing the SADCT without varying the grid in the conventional method with respect to the image of the object among the image of the old woman and the result which is obtained by performing the FBG-SADCT and the VBG-SADCT after varying the position of the grid in the compaction method according to the present invention.

As a result, it is possible to reduce the amount of bits by about 8.10% by performing the VBG-SADCT 2-X rather than by performing the SADCT by the image of the object.

Meanwhile, FIG. 17 shows a block diagram showing the compaction/motion estimation apparatus according to a firs embodiment of the present invention, which is directed to detecting the grid moving position and the position at which the amount of information is reduced with respect to the image of the object having predetermined shape information and estimating the compaction and motion after reforming the grid in accordance with the position at which the amount of information is reduced.

In the drawings, reference numeral 41 denotes an image signal input unit for inputting the image of the object having predetermined shape information. References numeral 43 denotes a grid moving unit for moving the position of the X-axis grid and the Y-axis grid in accordance with the position in which the image of the object exists and for detecting a position at which the image of the object exists in the minimum number of unit regions.

In addition, the grid moving unit 43 having the same construction as the grid moving apparatus as shown in FIG. 4 is directed to sequentially storing the image of the object which is inputted by the image signal unit 41, moving the grid start position with respect to the stored image of the object at a predetermined distance within the range of the X-axis and Y-axis, and separating the image of the object into a plurality of unit regions in accordance with the moved grid start position. In addition, the grid moving unit 43 is directed to judging and counting the unit regions in which the image of the object exists among the unit regions and outputting the X-axis and Y-axis grid start positions at which the minimum number of unit regions among the counted values is counted as the positions at which the amount of information is reduced.

In the drawings, reference numeral 45 denotes a compaction unit for reforming the X-axis grid and the Y-axis grid in accordance with the positions at which the amount of information is reduced outputted from the grid moving unit 43 and for coding the image of the object.

The compaction unit 45 is directed to reforming the grid in accordances with the positions at which the amount of information is reduced, namely, which is referred to as the X-axis grid start position and Y-axis grid start position at which the image of the object exists in the minimum number of unit regions. Here, the positions at which the amount of information is reduced is detected by the grid moving apparatus and the grid moving method.

As a method for coding the image of the object of the unit regions using the compaction unit 45, there are many methods.

For example, the compaction is performed using SADCT, DCT, vector quantumization or the like.

In the drawings, reference numeral 47 denotes a motion estimation unit for estimating the motion of the image of the object. Here, the motion estimation unit 27 is directed to reforming the grid in accordance with the position at which the amount of information is reduced, which is detected by the grid moving apparatus and the grid moving method, segmenting the unit regions in which the image of the object exists in the reformed grid, and generating the motion information by estimating the varied amount of the segmented unit regions.

On the assumption that the image of the object as shown in FIG. 18A is given, which indicating the grid as shown in FIG. 18B so as to estimate the motion of the image of the given object, the number of the unit regions in which the image of the object exists in each row is referred to 3, 5, 4, 4, 4, 5, 7, 8, 8. Namely, the images of the motion compensable object exist in all 48 unit regions.

Therefore, the present invention is directed to estimating the motion by reforming the grid from the above-mentioned object as shown in FIG. 18C in accordance with the positions at which the amount of information is reduced which are detected by the grid moving apparatus and the grid moving method.

As a result of the reformation of the grid in accordance with the positions at which the amount of information is reduced, the number of the unit regions in which the image of the object exists in each row is referred to 3, 4, 4, 3, 3, 5, 7, 7, 8. Namely, it appeared that the number of the unit regions is reduced to all 44 unit regions. Therefore, it is possible to reduce the motion information amount by estimating the motion of the image of the object with respect to the reduced number of unit regions.

Figure 19:
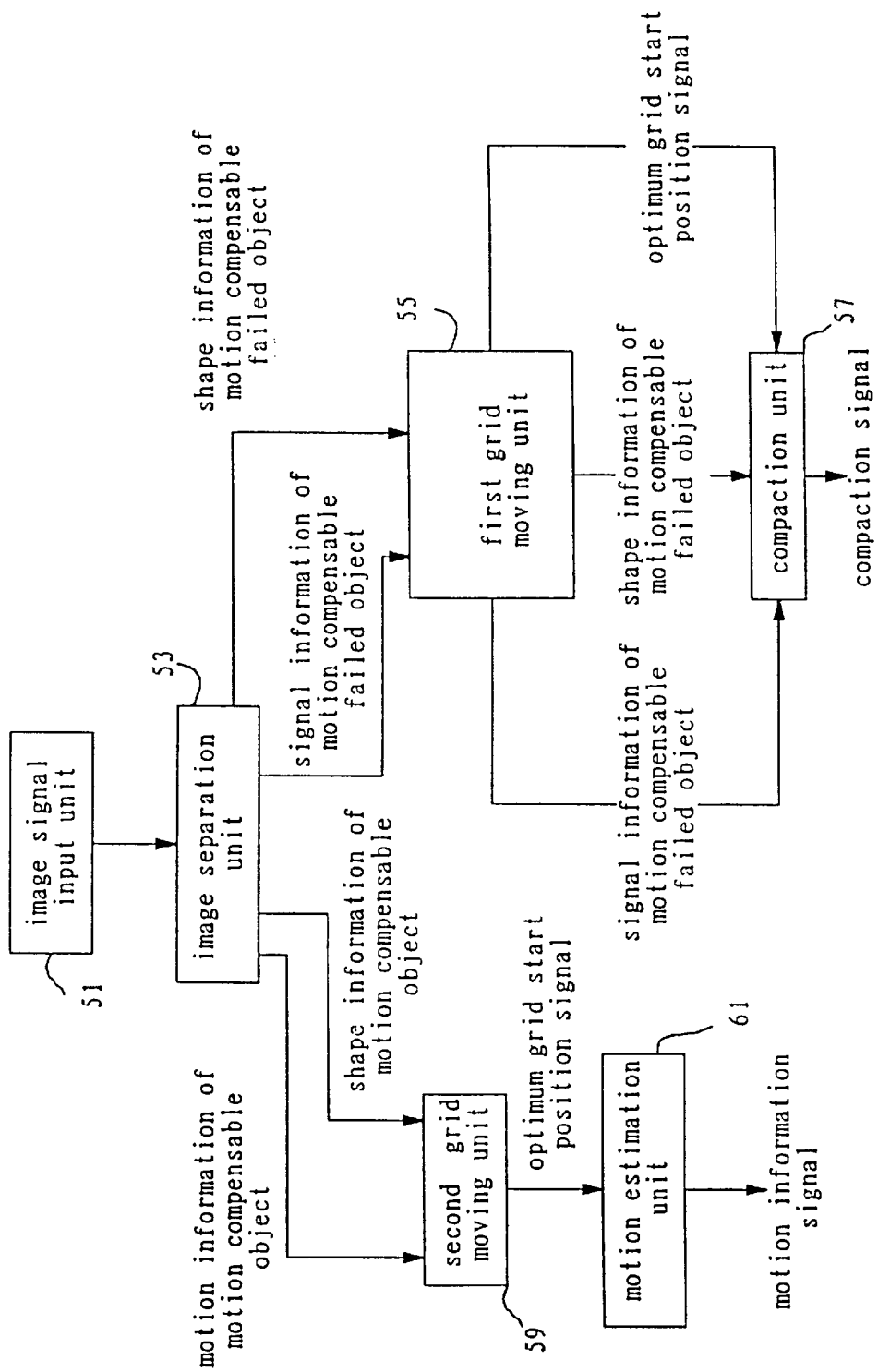
FIG. 19 is a block diagram showing another motion estimation/compaction apparatus according to the second embodiment of the present invention.

FIG. 19 shows a compaction/motion estimation apparatus according to a second embodiment of the present invention which is directed to separating the image of the object having predetermined shape information into the motion compensable object and the motion compensable failed object, coding the separated motion compensable failed object, and estimating the motion of the motion compensable object.

Here, in the drawings, reference numeral 51 denotes and image signal input unit for inputting an image signal having predetermined shape information to be coded.

Reference numeral 53 denotes an image separation unit for separating the image signal outputted from the image signal input unit 51 into the image of the background image having no motion and the image of the moving object having motion.

Here, the changed region of the image of the moving object is judged using the information varied between the previously inputted image and the currently inputted image.

Figure 20:
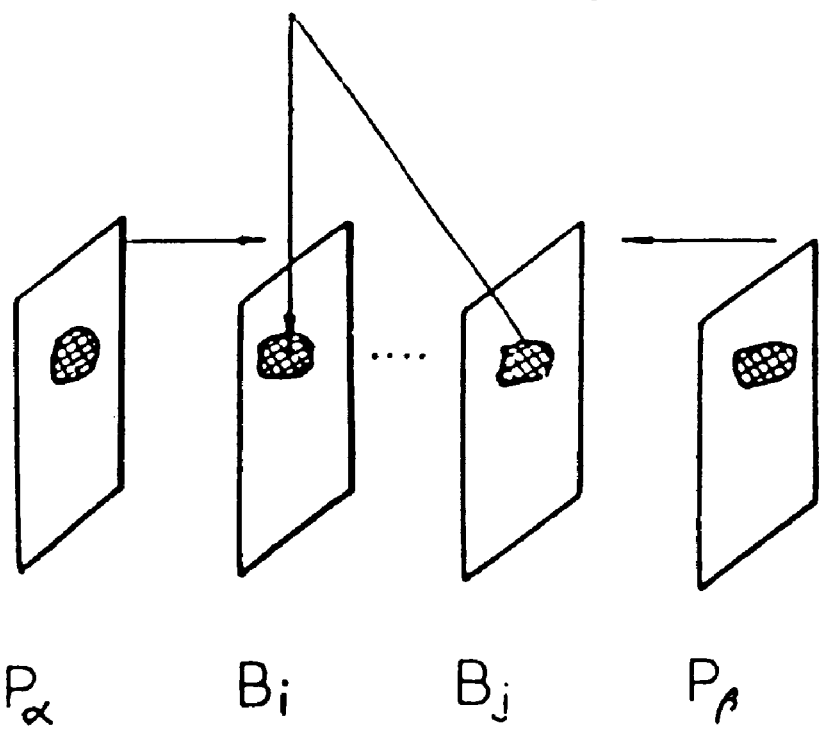
FIG. 20 is a view showing an image frame so as to explain a time lapse-based variation according to the present invention.

FIG. 20 shows the time-based variation of the inputted image frame. As shown therein, it appeared that a plurality of intermediate image frames Bi, . . . , Bj exist between the frame Pα of the previously inputted image and the frame P of the currently inputted image.

Therefore, for the image of the moving object, there is a forward motion estimation of estimating the frame Bi of the intermediate image from the frame Pα of the previous image and a backward motion estimation method of estimating the frame Bj of the intermediate image of the frame P of the current image.

The image of the moving object estimated by the image separation unit 53 is separated into moving information of the motion compensable object, shape information of the motion compensable object, signal information of the motion compensable failed object, and shape information of the motion compensable failed object.

In the drawings, reference numeral 55 denotes a first grid moving unit for detecting the positions at which the amount of information is reduced using shape information of the motion compensable failed object separated by the image separation unit 53.

The first grid moving unit 55 has the same construction as the grid moving unit 43 and as the grid moving apparatus of FIG. 4. The first grid moving unit 55 is directed to adjusting the grid position in accordance with the position at which the image of the motion compensable failed object separated by the image separation unit 53 and outputting the position in which the image of the motion compensable failed object exist in the minimum number of unit regions.

In the drawings, reference numeral 57 denotes a compaction unit for coding a signal of the position at which the amount of information is reduced outputted from the first grid moving unit 55 and the image of the motion compensable failed object in accordance with the position at which the amount of information is reduced detect the grid moving method.

The compaction unit 57 is directed to reforming the grid using the position at which the amount of information is reduced as a reference and coding the image of the motion compensable failed object of the unit region in which the image of the motion compensable failed object exists in the unit region of the reformed grid using the methods of SADCT, DCT, or vector quantumization.

Figure 1A:
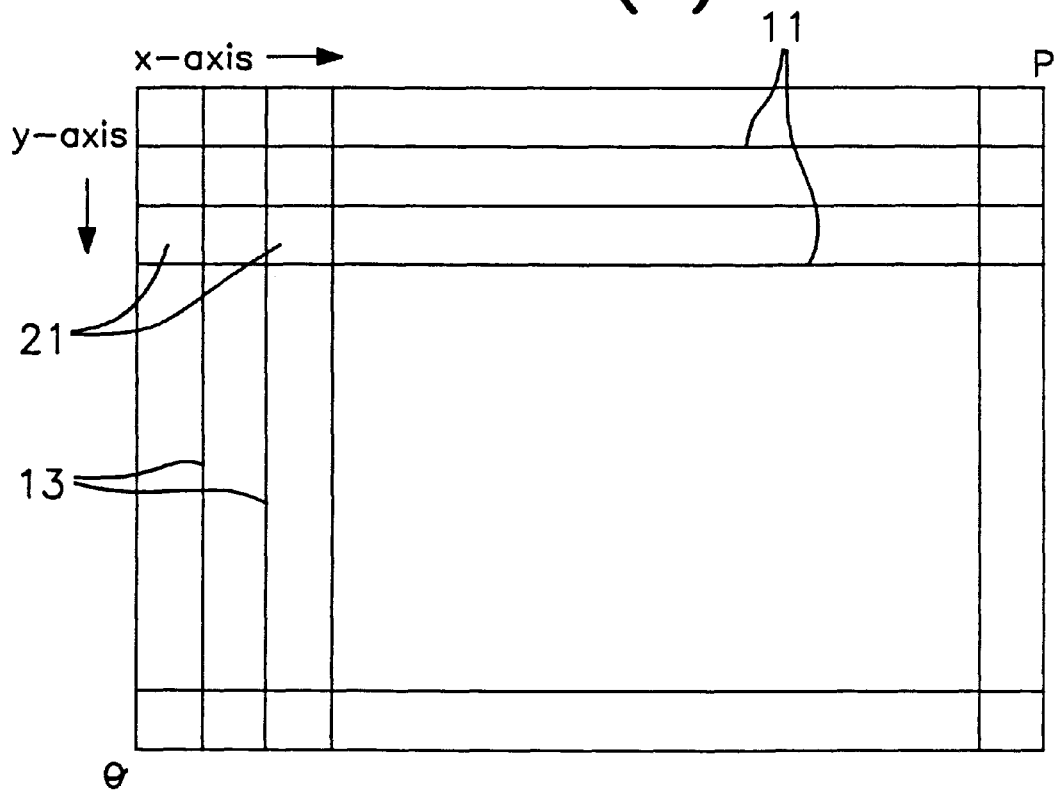
Figure 1B:
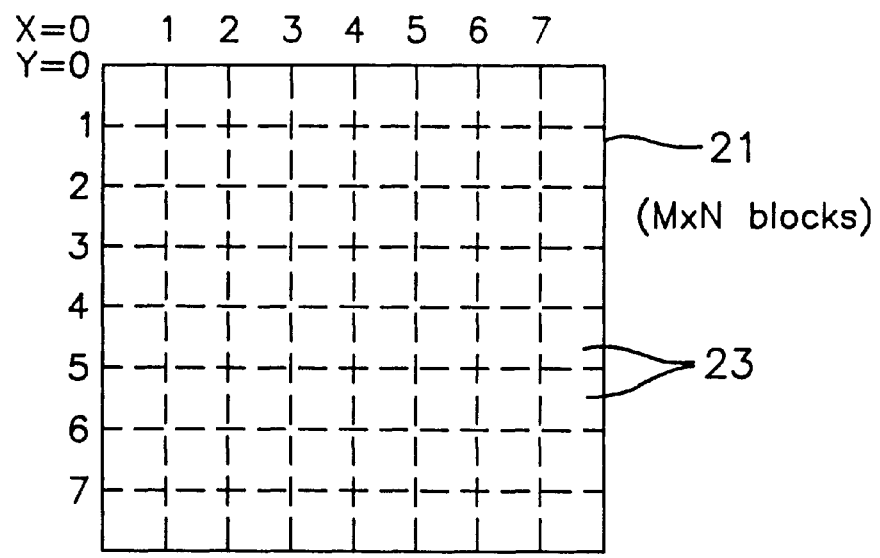

In the drawings, reference numeral 59 denotes a second grid moving unit having the same construction as the grid moving apparatus of FIG. 1, the grid moving unit 43, and the first grid moving unit 55. The first grid moving unit 55 is directed to adjusting the position of the grid in accordance with the position at which the image of the motion compensable object separated by the image separation unit 53 and outputting the position in which the image of the motion compensable object exists in the minimum number of unit regions.

Reference numeral 61 denotes a motion estimation unit which is directed to reforming the grid in accordance with the signal of the position at which the amount of information is reduced outputted from the second grid moving unit 59 and the position at which the amount of information is reduced detected by the grid moving method, segmenting the image of the motion compensable object into the unit regions from the reformed grid, and generating the motion information using the variation amount of the segmented unit regions.

As described above, the grid moving method for minimizing image information of an object and an apparatus using the grid moving method and the compaction/motion estimation method using the grid moving method and an apparatus thereof according to the present invention are directed to forming the minimum number of unit regions having the image of the object by adjusting the position of the grid in accordance with the image position of the object, coding the image of the object with respect to the minimum number of unit regions, and generating the motion information, thus achieving a higher compaction rate, whereby the amount of the data to be stored and transmitted can be significantly reduced.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A compaction/motion estimation apparatus using a grid moving method for minimizing image information of an object, comprising:

image signal input means for inputting an image of an object having shape information;

grid moving means for adjusting a grid in accordance with an image position of an object having the shape information outputted from the image signal input means and for reducing the number of unit regions in which the image of the object exists, comprising address generation control means for moving an address start position at which an address is generated, region number counting means for counting the number of the unit regions in which the image of the object exists at each address, and minimum unit region grid selecting means for selecting an address start position at which the minimum number of the unit regions is counted from among the number of the counted unit regions and determining the selected address start position;

compaction means for coding the image of the object existing in the unit regions in which the number of unit regions is reduced in the grid moving means; and motion estimation means for estimating a motion of the image of the object using the motion of unit regions of which the number of unit regions is reduced.

2. The apparatus of claim 1, wherein said grid moving means further includes:

address generation means for separating the image of the object into unit regions in accordance with the address start position outputted from the address generation control means and for generating the address; and memory means for storing the image of the object having inputted shape information and for outputting a unit region in accordance with the address which the address generation means generates.

3. The apparatus of claim 2, wherein said address generation means includes:

X-axis range determining means and Y-axis range determining means for determining the X-axis range of the unit region and the Y-axis range of the unit region in accordance with size information of the inputted image of the object; and region address generation means for separating the X-axis range and Y-axis range of the unit region which the X-axis range determining means and the Y-axis range determining means determined from the address start position outputted from the address generation control means and for sequentially outputting an address in accordance with the X-axis range and Y-axis range of the unit regions separated by the region address generation means.

4. The apparatus of claim 3, wherein said X-axis range and Y-axis range of the unit region are determined by one size determining means when the X-axis range and Y-axis range of the unit region are the same.

5. The apparatus of claim, wherein said region number counting means includes:

region counting means for counting a clock signal and for separating the unit region;

shape information existing judging means for separating the unit region of the image outputted from the memory means in accordance with an output signal of the region counting means and for judging as to whether there exists a shape information of the object; and region number adding means for counting a judging signal of the shape information existing judging means and for outputting the number of the unit regions in which the image of the object exists.

6. A compaction apparatus using a grid moving of an object image, comprising;

image signal input means for inputting an image of an object having shape information;

grid moving means for reducing the number of unit regions in which the image of an object exists by adjusting a grid in accordance with an image position of an object having the shape information outputted from the image signal input means, comprising address generation control means for moving an address start position at which an address is generated, region number counting means for counting the number of the unit regions in which the image of the object exists at each address, and minimum unit region grid selecting means for selecting an address start position at which the minimum number of the unit regions is counted from among the number of the counted unit regions and determining the selected address start position; and compaction means for coding the image of the object existing in the unit regions of which the number of unit regions is reduced by the grid moving means.

7. The apparatus of claim 6, wherein said grid moving means further includes:

address generation means for separating the image of the object into unit regions in accordance with the address start position outputted from the address generation control means; and memory means for storing the image of the object having inputted shape information and for outputting a unit region in accordance with an address outputted from the address generation means.

8. The apparatus of claim 7, wherein said address generation means includes:

X-axis range determining means and Y-axis range determining means for determining the X-axis range of the unit region and the Y-axis range of the unit region in accordance with size information of the inputted image of the object; and region address generation means for separating the X-axis range and Y-axis range of the unit region determined by the X-axis range determining means and Y-axis range determining means from the address start position outputted from the address generation control means and for sequentially outputting an address in accordance with the X-axis range and Y-axis range of the unit region separated by the region address generation means.

9. The apparatus of claim 8, wherein said X-axis range Y-axis range of the unit region are determined by one size determining means when the X-axis range and Y-axis range of the unit region are the same.

10. The apparatus of claim 7, wherein said region number counting means includes:

region counting means for counting a clock signal and for separating the unit region;

shape information existing judging means for separating the unit region of the image outputted from the memory means in accordance with an output signal of the region counting means and for judging as to whether there exists shape information of the object; and region number adding means for counting a judging signal of the shape information existing judging means and for outputting the number of the unit regions in which the image of the object exists.

11. A motion estimation apparatus using a grid moving of an object image, comprising:

image signal input means for inputting an image of an object having shape information;

grid moving means for adjusting the grid in accordance with an image position of an object having shape information outputted from the image signal input means and for reducing the number of unit regions in which the image of the object exists, comprising address generation control means for moving an address start position at which an address is generated, region number counting means for counting the number of the unit regions in which the image of the object exists at each address, and minimum unit region grid selecting means for selecting an address start position at which the minimum number of the unit regions is counted from among the number of the counted unit regions and determining the selected address start position; and motion estimation means for estimating a motion of the image of the object using the motion of the unit regions of which the number of unit regions is reduced.

12. The apparatus of claim 11, wherein said grid moving means further includes:

address generation means for separating the image of the object into unit regions in accordance with the address start position outputted from the address generation control means;

memory means for storing the image of the object having inputted shape information and for outputting a unit region in accordance with an address outputted from the address generation means.

13. The apparatus of claim 12, wherein said address generation means includes:

X-axis range determining means and Y-axis range determining means for determining the X-axis range of the unit region and the Y-axis range of the unit region in accordance with size information of the inputted image of the object; and region address generation means for separating the X-axis range and Y-axis range of the unit region determined by the X-axis range determining means and Y-axis range determining means from the address start position outputted from the address generation control means and for sequentially outputting an address in accordance with the X-axis range and Y-axis range of the unit regions separated by the region address generation means.

14. The apparatus of claim 13, wherein said X-axis range and Y-axis range of the unit region are determined by one size determining means when the X-axis range and Y-axis range of the unit region are the same.

15. The apparatus of claim 12, wherein said region number counting means includes:

region counting means for counting a clock signal and for separating the unit region;

shape information existing judging means for separating the unit region of the image outputted from the memory means in accordance with an output signal of the region counting means and for judging as to whether there exists a shape information of the object; and region number adding means for counting a judging signal of the shape information existing judging means and for outputting the number of the unit regions in which the image of the object exists.

16. A compaction/motion estimation apparatus using a grid moving of an object image, comprising:

image separating means for separating an image of a motion compensable failed object and an image of a motion compensable object in accordance with a motion from an image of an object having shape information;

first grid moving means for adjusting the grid in accordance with an image position of the motion compensable failed object separated by the image separating means and for reducing the number of unit regions in which the image of the motion compensable failed object exists, comprising first address generation control means for moving an address start position at which an address is generated, first region number counting means for counting the number of the unit regions in which the image of the object exists at each address, and first minimum unit region grid selecting means for selecting an address start position at which the minimum number of the unit regions is counted from among the number of the counted unit regions and determining the selected address start position;

compaction means for coding the image of the object existing in the unit regions of which the number of unit regions is reduced by the first grid moving means;

second grid moving means for adjusting the grid in accordance with the image position of the motion compensable object separated by the image separating means and for reducing the number of unit regions in which the image of the motion compensable object exists, comprising second address generation control means for moving an address start position at which an address is generated, second region number counting means for counting the number of the unit regions in which the image of the object exists at each address, and second minimum unit region grid selecting means for selecting an address start position at which the minimum number of the unit regions is counted from among the number of the counted unit regions and determining the selected address start position; and motion estimation means for estimating the motion information of the motion compensable object using the unit regions in which the image of the motion compensable object exists of which the number of the unit regions is reduced.

17. The apparatus of claim 16, wherein said first and second grid moving means further includes:

address generating means for separating the image of the object into unit regions in accordance with the address start position outputted from the address generation control means;

memory means for storing the image of the object having inputted shape information and for outputting a unit region in accordance with an address outputted from the address generation means.

18. The apparatus of claim 17, wherein said address generation means includes:

X-axis range determining means and Y-axis range determining means for determining the X-axis range of the unit region and the Y-axis range of the unit region in accordance with size information of the inputted image of the object; and region address generation means for separating the X-axis range and Y-axis range of the unit region determined by the X-axis range determining means and Y-axis range determining means from the address start position outputted from the address generation control means and for sequentially outputting an address in accordance with the X-axis range and Y-axis range of the unit region separated by the address generation means.

19. The apparatus of claim 18, wherein said X-axis range and Y-axis range of the unit region are determined by one size determining means when the X-axis range and Y-axis range of the unit region are the same.

20. The apparatus of claim 16, wherein said region number counting means includes:

region counting means for counting a clock signal and for separating the unit region;

shape information existing judging means for separating the unit region of the image outputted from the memory means in accordance with an output signal of the region counting means and for judging as to whether there exists a shape information of the object; and region number adding means for counting a judging signal of the shape information existing judging means and for outputting the number of the unit regions in which the image of the object exists.

21. A compaction apparatus using a grid moving of an object image, comprising:

image separating means for separating an image of a motion compensable failed object in accordance with a motion of an image of an object having shape information;

grid moving means for adjusting the grid in accordance with an image position of the motion compensable failed object separated by the image separating means and for reducing the number of unit regions in which the image of the motion compensable failed object exists, comprising address generation control means for moving an address start position at which an address is generated, region number counting means for counting the number of the unit regions in which the image of the object exists at each address, and minimum unit region grid selecting means for selecting an address start position at which the minimum number of the unit regions is counted from among the number of the counted unit regions and determining the selected address start position; and compaction means for coding the image of the object existing in the unit regions of which the number of the unit regions is reduced by the grid moving means.

22. The apparatus of claim 21, wherein said first and second grid moving means further includes:

address generation means for separating the image of the object into unit regions in accordance with the address start position outputted from the address generation control means;

memory means for storing the image of the object having inputted shape information and for outputting a unit region in accordance with an address outputted from the address generation means.

23. The apparatus of claim 22, wherein said address generation means includes:

X-axis range determining means and Y-axis range determining means for determining the X-axis range of the unit region and the Y-axis region of the unit region in accordance with size information of the inputted image of the object; and region address generation means for separating the X-axis range and Y-axis range of the unit region determined by the X-axis range determining means and Y-axis range determining means from the address start position outputted from the address generation control means and for sequentially outputting an address in accordance with the X-axis range and Y-axis range of the unit region separated by the address generation means.

24. The apparatus of claim 23, wherein said X-axis range and Y-axis range of the unit region are determined by one size determining means when the X-axis range and Y-axis range of the unit region are the same.

25. The apparatus of claim 22, wherein said region number counting means includes:

region counting means for counting a clock signal and for separating the unit region;

shape information existing judging means for separating the unit region of the image outputted from the memory means in accordance with an output signal of the region counting means and for judging as to whether there exists a shape information of the object; and region number adding means for counting a judging signal of the shape information existing judging means and for outputting the number of the unit regions in which the image of the object exists.

26. A motion estimation apparatus using a grid moving of an object image, comprising:

image separating means for separating an image of a motion compensable object in accordance with a motion of an object having shape information;

grid moving means for adjusting a grid in accordance with an image position of the motion compensable object separated by the image separated means and for reducing the number of unit regions in which the image of the motion compensable object exists, comprising address generation control means for moving and address start position at which an address is generated, region number counting means for counting the number of the unit regions in which the image of the object exists at each address, and minimum unit region grid selecting means for selecting an address start position at which the minimum number of the unit regions is counted from among the number of the counted unit regions and determining the selected address start position; and motion estimation means for estimating motion information of the motion compensable object using the unit regions in which the image of the motion compensable object exists of which the number of the unit regions is reduced by the grid moving means.

27. The apparatus of claim 26, wherein said first and second grid moving means further includes:

address generation means for separating the image of the object into unit regions in accordance with the address start position outputted from the address generation control means;

memory means for storing the image of the object having inputted shape information and for outputting a unit region in accordance with an address outputted from the address generation means.

28. The apparatus of claim 27, wherein said address generation means includes:

X-axis range determining means and Y-axis range determining means for determining the X-axis range of the unit region and the Y-axis range of the unit region in accordance with size information of the inputted image of the object; and region address generation means for separating the X-axis range and Y-axis range of the unit region determined by the X-axis range determining means and Y-axis range determining means from the address start position outputted from the address generation control means and for sequentially outputting an address in accordance with the X-axis range and Y-axis range of the unit region separated by the address generation means.

29. The apparatus of claim 28, wherein said X-axis range and Y-axis range of the unit region are determined by one size determining means when the X-axis range and Y-axis range of the unit region are the same.

30. The apparatus of claim 27, wherein said region number counting means includes:

region counting means for counting a clock signal and for separating the unit region;

shape information existing judging means for separating the unit region of the image outputted from the memory means in accordance with an output signal of the region counting means and for judging as to whether there exists a shape information of the object; and region number adding means for counting a judging signal of the shape information existing judging means and for outputting the number of the unit regions in which the image of the object exits.

* * * * *